(12) United States Patent
Vinciarelli

(10) Patent No.: US 12,706,527 B1
(45) Date of Patent: Aug. 11, 2026

(54) DRIVING SEMICONDUCTOR SWITCHES IN POWER CONVERTERS

(71) Applicant: Vicor Corporation, Andover, MA (US)

(72) Inventor: Patrizio Vinciarelli, Boston, MA (US)

(73) Assignee: Vicor Corporation, Andover, MA (US)

( * ) Notice: Subject to any disclaimer, the term of this patent is extended or adjusted under 35 U.S.C. 154(b) by 882 days.

(21) Appl. No.: 17/881,144

(22) Filed: Aug. 4, 2022

(51) Int. Cl.
*H02M 1/08* (2006.01)
*H02M 1/00* (2007.01)
*H02M 1/088* (2006.01)
*H02M 3/00* (2006.01)
*H02M 3/335* (2006.01)

(52) U.S. Cl.
CPC ......... *H02M 1/083* (2013.01); *H02M 1/0058* (2021.05); *H02M 1/088* (2013.01); *H02M 3/01* (2021.05); *H02M 3/33571* (2021.05); *H02M 3/33592* (2013.01)

(58) Field of Classification Search
CPC .... H02M 1/083; H02M 1/0058; H02M 1/088; H02M 3/33571; H02M 3/01; H02M 3/33592; H03K 17/00; H03K 17/13; H03K 17/133; H03K 17/691
See application file for complete search history.

(56) References Cited

U.S. PATENT DOCUMENTS 5,736,890 A * 4/1998 Yee ...................... H02M 7/217 327/423
6,462,963 B1 10/2002 Wittenbreder
6,580,255 B1 6/2003 Wittenbreder, Jr.
6,788,033 B2 9/2004 Vinciarelli
6,822,427 B2 11/2004 Wittenbreder
6,930,893 B2 * 8/2005 Vinciarelli .............. H02M 3/28 363/17
6,975,098 B2 12/2005 Vinciarelli
(Continued)

FOREIGN PATENT DOCUMENTS

EP 1977514 B1 * 5/2013 .......... H01M 10/441

OTHER PUBLICATIONS

Machine Translation EP_1977514_B1 (Year: 2007).*
(Continued)

*Primary Examiner* — Thienvu V Tran
*Assistant Examiner* — Yahveh Comas Torres
(74) *Attorney, Agent, or Firm* — Fish & Richardson P.C.

(57) ABSTRACT

An electronic switch driver improves control of semiconductor switches in resonant power trains, improves ZVS operation, eases design challenges, improves manufacturability, and scalability of power converter design. Individual switch timing control is offloaded from the main power train controller, eliminating the effects of parasitic impedances and timing errors, particularly in high power, large power trains. Deployed locally at each controlled switch, the driver circuit includes logic to optimize ZVS operation of the controlled switch in steady state operation and ensures continuity of operation, e.g. during start-up and other conditions under which ZVS may not be achieved. The driver circuit may turn the controlled switch OFF quickly in response to an ON command, ON quickly in response to an ON command when predetermined conditions, e.g. ZVS, exist; and ON slowly in response to an ON command when predetermined conditions, e.g. ZVS, do not exist.

65 Claims, 6 Drawing Sheets

(56) References Cited

U.S. PATENT DOCUMENTS

| | | | | |
|---|---|---|---|---|
| 6,984,965 | B2 | 1/2006 | Vinciarelli | |
| 6,985,341 | B2 | 1/2006 | Vinciarelli et al. | |
| 7,145,786 | B2 | 12/2006 | Vinciarelli | |
| 7,154,250 | B2 | 12/2006 | Vinciarelli | |
| 7,368,957 | B2 * | 5/2008 | Clarkin | H02M 1/08 327/434 |
| 7,948,296 | B2 * | 5/2011 | Nadd | H02M 1/088 327/494 |
| 8,130,029 | B2 * | 3/2012 | Kinsella | H03K 17/063 327/543 |
| 9,166,481 | B1 | 10/2015 | Vinciarelli et al. | |
| 9,571,084 | B1 | 2/2017 | Vinciarelli | |
| 9,825,625 | B2 * | 11/2017 | Thalheim | H02H 3/08 |
| 10,014,798 | B1 | 7/2018 | Vinciarelli | |
| 10,020,752 | B1 | 7/2018 | Vinciarelli | |
| 10,116,294 | B1 * | 10/2018 | Xu | H03K 17/687 |
| 10,153,704 | B1 | 12/2018 | Vinciarelli | |
| 10,158,357 | B1 | 12/2018 | Vinciarelli et al. | |
| 10,171,071 | B2 * | 1/2019 | Rätz | H03K 5/08 |
| 10,218,257 | B2 | 2/2019 | Blum et al. | |
| 10,277,105 | B1 | 4/2019 | Vinciarelli et al. | |
| 10,637,364 | B1 | 4/2020 | Vinciarelli | |
| 10,784,765 | B1 | 9/2020 | Vinciarelli et al. | |
| 10,785,871 | B1 | 9/2020 | Vinciarelli et al. | |
| 10,903,734 | B1 | 1/2021 | Vinciarelli | |
| 10,998,903 | B1 | 5/2021 | Vinciarelli et al. | |
| 11,018,594 | B1 | 5/2021 | Vinciarelli | |
| 11,018,599 | B1 | 5/2021 | Vinciarelli | |
| 11,101,795 | B1 | 8/2021 | Vinciarelli et al. | |
| 11,228,246 | B1 | 1/2022 | Vinciarelli | |
| 11,233,447 | B1 | 1/2022 | Vinciarelli et al. | |
| 11,271,490 | B1 | 3/2022 | Vinciarelli | |
| 11,324,107 | B1 | 5/2022 | Vinciarelli et al. | |
| 2005/0285661 | A1 | 12/2005 | Wittenbreder | |
| 2008/0018364 | A1 * | 1/2008 | Clarkin | H03K 17/133 327/110 |
| 2015/0280574 | A1 * | 10/2015 | Gong | H02M 3/33523 363/21.12 |
| 2017/0187367 | A1 * | 6/2017 | Rätz | H03K 17/082 |

OTHER PUBLICATIONS

U.S. Appl. No. 17/475,146, Vinciarelli et al., filed Sep. 14, 2021.

U.S. Appl. No. 63/354,681, Vinciarelli et al., filed Jun. 22, 2022.

Barkhordarian, "Power MOSFET Basics," International Rectifier, 1997, 13 pages.

edn.com [online], "Characterizing the dynamic output capacitance of a MOSFET," Sep. 18, 2013, retrieved on Aug. 5, 2022, retrieved from URL<https://www.edn.com/characterizing-the-dynamic-output-capacitance-of-a-mosfet/>, 8 pages.

International Rectifier, "Application Note AN-1001: A More Realistic Characterization of Power MOSFET Output Capacitance Coss," available no later than Aug. 4, 2022, 4 pages.

Micrel Inc., "MIC4414/4415: 1.5A, 4.5V to 18V, Low-Side MOSFET Driver," Aug. 2012, 14 pages.

powerelectronicsnews.com [online], "Origins of SiC FETs and Their Evolution Toward the Perfect Switch," Sep. 17, 2021, retrieved on May 20, 2022, retrieved from URL<https://www.powerelectronicsnews.com/origins-of-sic-fets-and-their-evolution-toward-the-perfect-switch/>, 14 pages.

Risseh et al., "Fast Switching Planar Power Module With SiC MOSFETs and Ultra-low Parasitic Inductance," Presented at 2018 International Power Electronics Conference (IPEC-Niigata 2018—ECCE Asia), Niigata, Japan, May 20-24, 2018, pp. 2732-2737.

Rogina et al., "Analysis of Intrinsic Switching Losses in Superjunction MOSFETs Under Zero Voltage Switching, " Energies, Mar. 2, 2020, 13(1124):1-13.

Wang et al., "Power MOSFETs Paralleling Operation for High Power High Density Converters," Conference Record of the 2006 IEEE Industry Applications Conference Forty-First IAS Annual Meeting, Oct. 2006, pp. 2284-2289.

* cited by examiner

DRIVING SEMICONDUCTOR SWITCHES IN POWER CONVERTERS

FIELD OF THE INVENTION

This invention relates to the field of power conversion, and more specifically to switching power converters.

BACKGROUND

In contemporary electronic systems, space is at a premium. Additionally, efficiency and thermal management considerations place limits on the power dissipation in power supplies. Resonant power converters are widely used to increase efficiency, reduce power dissipation, and increase power density. Switches in a resonant power train are typically controlled by a centralized control circuit responsible for both operation of the power train and control of the individual switches. Resonant control of the switches in power converters may impose design and manufacturability challenges.

The following disclosure describes advancements in controlling and driving semiconductor switches in power converters to improve efficiency, scalability, and manufacturability.

SUMMARY

In general, in one aspect, an apparatus for operating a semiconductor switch having a gate terminal, a source terminal, and a drain terminal is provided. The apparatus includes: driver circuitry having a first input for receiving a switch control signal, an output for connection to the gate terminal, a common terminal for connection to the source terminal, and a second input for sensing the drain terminal. The driver circuitry includes: a first switch to turn off the gate terminal in response to an OFF signal at the first input; a threshold detector connected to the second input and constructed and arranged to provide a ZVS signal indicating whether the drain-to-source voltage level is below a predetermined threshold; a second switch to turn on the gate terminal after an ON signal is received at the first input and the ZVS signal is received from the threshold detector; a slope detector connected to the second input and constructed and arranged to provide a slope signal indicating the rate of change of the drain-to-source voltage level; and gate slew control circuitry constructed and arranged to control a rate of change of voltage at the output for slowly turning ON the semiconductor switch in response to an ON signal at the first input and the slope signal if the ZVS signal indicates the drain-to-source voltage is above the predetermined threshold.

The above general aspect can include one or more of the following features. The driver circuitry can be constructed and arranged to: (a) turn the semiconductor switch OFF quickly using the first switch in response to an OFF signal at the first input; (b) turn the semiconductor switch ON slowly using the gate slew control circuitry in response to a ON signal at the first input and the slope signal while the ZVS signal indicates the drain-to-source voltage is above the predetermined threshold; and (c) turn the semiconductor switch ON quickly using the second switch in response to a ON signal at the first input once the ZVS signal indicates the drain-to-source voltage is below the predetermined threshold.

The driver circuitry can be configured to (a) turn the semiconductor switch OFF within a first time duration using the first switch in response to the OFF signal at the first input, (b) turn the semiconductor switch ON slowly within a second time duration using the gate slew control circuitry in response to the ON signal at the first input and the slope signal while the ZVS signal indicates the drain-to-source voltage is above the predetermined threshold, and (c) turn the semiconductor switch ON within a third time duration using the second switch in response to the ON signal at the first input once the ZVS signal indicates the drain-to-source voltage is below the predetermined threshold. The first time duration can be less than 33% of the second time duration, and the third time duration can be less than 33% of the second time duration.

The driver circuitry can be further constructed and arranged to: (d) adjust the rate of change of voltage at the output as a function of the slope signal while the ON signal is present at the first input and the ZVS signal indicates the drain-to-source voltage is above the predetermined threshold.

The driver circuitry can be configured to decrease the rate of change of voltage at the output in response to an increase of the slope signal while the ON signal is present at the first input and the ZVS signal indicates the drain-to-source voltage is above the predetermined threshold.

The driver circuitry can be constructed and arranged to: (a) turn the semiconductor switch OFF quickly using the first switch in response to an OFF signal at the first input; (b) slowly increase a voltage at the output in response to an ON signal at the first input while the ZVS signal indicates the drain-to-source voltage is above the predetermined threshold; and (c) turn the semiconductor switch ON with a predetermined minimum delay in response to an ON signal at the first input using the second switch if the ZVS signal indicates the drain-to-source voltage is below the predetermined threshold. The driver circuitry can establish a maximum delay for turning the semiconductor switch ON after an ON signal is received at the first input and a minimum delay for turning the semiconductor switch ON after the ZVS signal indicates the drain-to-source voltage is below the predetermined threshold.

The driver circuitry can be configured to (a) turn the semiconductor switch OFF within a first time duration using the first switch in response to the OFF signal at the first input; (b) increase the voltage at the output from a first level that causes the semiconductor switch to be OFF to a second level that causes the semiconductor switch to be ON within a second time duration in response to the ON signal at the first input while the ZVS signal indicates the drain-to-source voltage is above the predetermined threshold; and (c) turn the semiconductor switch ON within a third time duration in response to the ON signal at the first input using the second switch if the ZVS signal indicates the drain-to-source voltage is below the predetermined threshold. The first time duration can be less than 33% of the second time duration, and the third time duration can be less than 33% of the second time duration.

The driver circuitry can be configured to turn the semiconductor switch ON with a delay that ranges from a predetermined minimum value to a predetermined maximum value. The driver circuitry can be configured to turn the semiconductor switch ON with a delay having the maximum delay value after the ON signal is received at the first input while the ZVS signal indicates the drain-to-source voltage is above the predetermined threshold. The driver circuitry is configured to turn the semiconductor switch ON with a delay having the predetermined minimum value in response to the ON signal at the first input using the second switch if the ZVS signal indicates the drain-to-source voltage is below the predetermined threshold.

The driver circuitry can be further constructed and arranged to adjust a delay for turning the semiconductor switch ON after the ON signal is received at the first input as a function of the slope signal.

The driver circuitry can be further constructed and arranged to increase the time required to turn the semiconductor switch ON slowly after the ON signal is received at the first input for a slope signal indicating an increased rate of change of the drain-to-source voltage level.

The driver circuitry can be configured to set a larger delay for turning the semiconductor switch ON after the ON signal is received at the first input and the slope signal has larger value, and set a smaller delay for turning the semiconductor switch ON after the ON signal is received at the first input and the slope signal has smaller value.

The driver circuitry can be further constructed and arranged to decrease the time required to turn the semiconductor switch ON slowly after the ON signal is received at the first input for a slope signal indicating a decreased rate of change of the drain-to-source voltage level.

The predetermined threshold can be approximately equal to a transition voltage for an output capacitance of the respective switch, such that the output capacitance, Coss, of the respective switch increases exponentially as a function of reductions in the drain-to-source voltage of the respective switch below the predetermined threshold.

The predetermined threshold can be greater than a transition voltage for an output capacitance of the respective switch, such that the output capacitance, Coss, of the respective switch increases exponentially as a function of reductions in the drain-to-source voltage of the respective switch below the predetermined threshold.

The first switch and the second switch can have one or more components in common.

The first switch can include a current sink that is activated in response to the OFF signal.

The second switch can include a first current source that is activated in response to the ON signal received at the first input and the ZVS signal received from the threshold detector.

The gate slew control circuitry can include a second current source configured to provide a current that is adjusted based on the slope signal if the ZVS signal indicates the drain-to-source voltage is above the predetermined threshold.

In general, in another aspect, a method of driving a semiconductor switch having a gate, a source, and a drain is provided. The method includes: (a) receiving an ON signal and an OFF signal at a driver input; (b) turning the switch OFF quickly in response to the OFF signal; (c) turning the switch ON quickly in response to the ON signal if a voltage across the drain and source is below a predetermined threshold; and (d) setting a delay for turning the semiconductor switch ON in response to the ON signal if the voltage across the drain and source is above the predetermined threshold. The setting the delay further includes controlling a rate of change of voltage at the gate as a function of a rate of change of the voltage across the drain and source.

Implementations of the above aspects can include one or more of the following features. Controlling the rate of change of voltage at the gate as a function of the rate of change of the voltage across the drain and source can include setting a lower rate of change of voltage at the gate in response to a higher rate of change of the voltage across the drain and source and setting a higher rate of change of voltage at the gate in response to a lower rate of change of the voltage across the drain and source.

Turning the switch OFF quickly in response to the OFF signal can include activating a current sink to sink a current from the output in response to the OFF signal at the driver input.

Turning the switch ON quickly in response to the ON signal can include activating a first current source to deliver a first current to the driver output in response to the ON signal if the voltage across the drain and source is below the predetermined threshold.

Setting the delay for turning the semiconductor switch ON in response to the ON signal can include activating a second current source to deliver a second current to the driver output in response to the ON signal if the voltage across the drain and source is above the predetermined threshold, and adjusting the second current according to the rate of change of the voltage across the drain and source.

Adjusting the second current according to the rate of change of the voltage across the drain and source can include setting the second current to a lower level in response to a higher rate of change of the voltage across the drain and source, and setting the second current to a higher level in response to a lower rate of change of the voltage across the drain and source.

The predetermined threshold can be approximately equal to a transition voltage for an output capacitance of the respective switch, such that the output capacitance, Coss, of the respective switch increases exponentially as a function of reductions in the drain-to-source voltage of the respective switch below the predetermined threshold.

The predetermined threshold can be greater than a transition voltage for an output capacitance of the respective switch, such that the output capacitance, Coss, of the respective switch increases exponentially as a function of reductions in the drain-to-source voltage of the respective switch below the predetermined threshold.

Setting the delay can include setting a low rate of change of voltage at the gate in response to a high rate of change of the voltage across the drain and source, and setting a high rate of change of voltage at the gate in response to a low rate of change of the voltage across the drain and source.

Turning the switch ON or OFF can include: (b) turning the switch OFF within a first time duration in response to the OFF signal; and (c) turning the switch ON within a second time duration in response to the ON signal if the voltage across the drain and source is below the predetermined threshold. The first time duration can be less than 33% of the delay for turning the semiconductor switch ON in response to the ON signal if the voltage across the drain and source is above the predetermined threshold. The second time duration can be less than 33% of the delay for turning the semiconductor switch ON in response to the ON signal if the voltage across the drain and source is above the predetermined threshold.

In general, in another aspect, an apparatus for converting power from an input for delivery to an output is provided. The apparatus includes a power train including one or more input switches constructed and arranged to selectively connect a resonant circuit including a transformer to the input, and one or more output switches constructed and arranged to selectively connect the transformer to the output. The apparatus includes a switch timing controller constructed and arranged to generate timing signals to operate the power train in a series of converter operating cycles; and one or more switch drivers having an input connected to receive selected ones of the timing signals from the switch timing controller. At least some of the input switches or the output switches, or both include a switch control terminal, a common terminal, and a switched terminal that is controlled by a respective switch driver. Each switch driver can include a first input for receiving a switch control signal from the switch controller, an output for connection to the control terminal of its respective switch, a reference terminal for connection to the common terminal of its respective switch, a second input for sensing circuit conditions at the switched terminal of its respective switch, and a power input for receiving power to operate. The switch driver can include: a first current sink connected to sink a first current from the output in response to an OFF signal at the first input; and a threshold detector connected to the second input and constructed and arranged to provide a ZVS signal indicating that a voltage, Vsw, across the switched terminal and the common terminal of its respective switch is at or below a predetermined threshold. The switch driver can include a first current source connected to deliver a first current to the output in response to an ON signal at the first input if the ZVS signal is received from the threshold detector; and a slope detector connected to the second input and constructed and arranged to provide a slope signal indicating the rate of change of the voltage, Vsw, across the switched terminal and the common terminal of its respective switch. The switch driver can include a second current source connected to deliver a second current to the output in response to an ON signal at the first input, the second current being adjusted by the slope signal.

Implementations of the above aspects can include one or more of the following features. Each switch driver can be constructed and arranged to: (a) turn its respective switch OFF quickly using the first current sink in response to an ON signal at the first input; (b) turn its respective switch ON slowly using the second current source in response to an ON signal at the first input; (c) turn its respective switch ON quickly using the first current source in response to an ON signal at the first input when the voltage Vsw of its respective switch is below the predetermined threshold; and (e) adjust the rate at which the respective switch is turned ON based upon the rate of change of the voltage Vsw of its respective switch.

Each driver circuit can be configured to: (a) turn its respective switch OFF within a first time duration using the first current sink in response to the ON signal at the first input; (b) turn its respective switch ON within a second time duration using the second current source in response to the ON signal at the first input; and (c) turn its respective switch ON within a third time duration using the first current source in response to the ON signal at the first input when the voltage Vsw of its respective switch is below the predetermined threshold. The first time duration can be less than 33% of the second time duration, and the third time duration can be less than 33% of the second time duration.

The apparatus of claim 10 wherein one or more of the at least some switches include a plurality of semiconductor switches connected in parallel to function as a single switch, and a plurality of respective switch drivers connected to operate respective ones of the plurality of semiconductor switches.

The one or more switch drivers can include a plurality of switch drivers. The apparatus can further include a gate drive transformer having a primary winding connected to receive timing signals from the switch timing controller and a plurality of secondary windings each connected to an input of a respective one of the plurality of switch drivers.

One or more of the at least some switches can include a plurality of semiconductor switches connected in parallel to function as a single switch, and a plurality of respective switch drivers connected to operate respective ones of the plurality of semiconductor switches.

Each switch driver can be constructed and arranged to adjust a delay for turning the respective switch ON after the ON signal is received at the first input as a function of the slope signal. The switch driver can be constructed and arranged to increase the time required to turn the respective switch ON slowly after the ON signal is received at the first input for a slope signal indicating an increased rate of change of the switched terminal voltage level. The switch driver can be constructed and arranged to decrease the time required to turn the respective switch ON slowly after the ON signal is received at the first input for a slope signal indicating a decreased rate of change of the switched terminal voltage level.

In general, in another aspect, an apparatus for converting power from an input for delivery to output terminals includes a switching power conversion stage having a power train including a plurality of distributed output switches constructed and arranged to selectively conduct power from the power train to the output terminals. Each output switch includes a switch control terminal, a common terminal, and a switched terminal. Each output switch is driven by a respective switch driver physically located proximal to said switch. The apparatus includes a switch timing controller constructed and arranged to generate timing signals to operate the power train including the plurality of distributed output switches, in a series of converter operating cycles; and a gate drive transformer having a primary winding connected to receive ON and OFF signals from the switch timing controller and a plurality of secondary windings each connected to deliver ON and OFF signals to one or more respective switch drivers. Each switch driver includes a first input connected to a respective secondary winding of the gate drive transformer to receive the ON and OFF signals from the timing controller, an output for connection to the control terminal of its respective switch, a reference terminal for connection to the common terminal of its respective switch, a second input for sensing circuit conditions at the switched terminal of its respective switch, and a power input connected to the respective secondary winding of the gate drive transformer for receiving power to operate. The switch driver includes circuitry operative to: quickly turn OFF the respective switch in response to the OFF signal at the first input, turn ON the respective switch in response to an ON signal at the first input if the voltage, Vsw, across the switched and common terminals of the respective switch is below a predetermined threshold; and control a rate of change of voltage at the output for slowly turning ON the respective power switch in response to an ON signal at the first input if the voltage, Vsw, across the switched and common terminals of the respective switch is above the predetermined threshold.

Implementations of the above aspects can include one or more of the following features. Each of at least some of the switch drivers can include: a threshold detector connected to the second input and constructed and arranged to provide a zero-voltage switching (ZVS) signal indicating whether the voltage Vsw across the switched and common terminals of the respective switch is below the predetermined threshold; a slope detector connected to the second input and constructed and arranged to provide a slope signal indicating the rate of change of the voltage Vsw across the switched and common terminals of the respective switch; and gate slew control circuitry constructed and arranged to control the rate of change of voltage at the output for slowly turning ON the respective switch in response to an ON signal at the first input and the slope signal if the ZVS signal indicates the voltage Vsw across the switched and common terminals of the respective switch is above the predetermined threshold.

Each of at least some of the switch drivers can be constructed and arranged to adjust a delay for turning the respective switch ON after the ON signal is received at the first input as a function of the slope signal. Each switch driver can be further constructed and arranged to increase the time required to turn the respective switch ON slowly after the ON signal is received at the first input for a slope signal indicating an increased rate of change of the voltage Vsw across the switched and common terminals of the respective switch.

Each of at least some of the switch drivers can be further constructed and arranged to decrease the time required to turn the respective switch ON slowly after the ON signal is received at the first input for a slope signal indicating a decreased rate of change of the voltage Vsw across the switched and common terminals of the respective switch.

Each of at least some of the switch drivers can include: a first current source connected to deliver a first current to the output in response to an ON signal at the first input if the ZVS signal indicates that the voltage Vsw across the switched and common terminals of the respective switch is below the predetermined threshold; and a second current source connected to deliver a second current to the output in response to an ON signal at the first input, the second current being adjusted by the slope signal.

The driver circuit can include circuitry configured to turn OFF the respective switch within a first time duration in response to the OFF signal at the first input, turn ON the respective switch within a second time duration in response to the ON signal at the first input if the drain-source voltage Vsw across the switched and common terminals of the respective switch is below the predetermined threshold, and control the rate of change of voltage at the output for turning ON the respective power switch within a third time duration in response to the ON signal at the first input if the voltage Vsw across the switched and common terminals of the respective switch is above the predetermined threshold. The first time duration can be less than 33% of the third time duration, and the second time duration can be less than 33% of the third time duration.

Each switch driver can include a first current sink connected to sink a first current from the output in response to an OFF signal at the first input; and a threshold detector connected to the second input and constructed and arranged to provide a zero-voltage switching (ZVS) signal indicating that a voltage, Vsw, across the switched terminal and the common terminal of its respective output switch is at or below a predetermined threshold. Each switch driver can include a first current source connected to deliver a first current to the output in response to an ON signal at the first input if the ZVS signal is received from the threshold detector; a slope detector connected to the second input and constructed and arranged to provide a slope signal indicating the rate of change of the voltage, Vsw, across the switched terminal and the common terminal of its respective output switch; and a second current source connected to deliver a second current to the output in response to an ON signal at the first input, the second current being adjusted by the slope signal.

Each switch driver can be constructed and arranged to adjust a delay for turning the respective output switch ON after the ON signal is received at the first input as a function of the slope signal. The switch driver can be constructed and arranged to increase the time required to turn the respective output switch ON slowly after the ON signal is received at the first input for a slope signal indicating an increased rate of change of the switched terminal voltage level. The switch driver can be constructed and arranged to decrease the time required to turn the respective switch ON slowly after the ON signal is received at the first input for a slope signal indicating a decreased rate of change of the switched terminal voltage level.

In general, in another aspect, a method of operating a power converter includes providing a plurality of power switches to operate a power train, each power switch having a respective gate, source, and drain terminals, and a drain-source voltage, Vsw. The method includes providing a switch timing controller constructed and arranged to provide ON and OFF switch control signals to operate the power train; providing a switch driver for operating a respective power switch; and providing each switch driver a first input for receiving the switch control signals, an output for connection to the gate terminal, a common terminal for connection to the source terminal, and a second input for sensing the drain terminal, of the respective power switch. The method includes using the switch driver to quickly turn off the respective power switch in response to the OFF signal at the first input, turn on the respective power switch in response to an ON signal at the first input if the drain-source voltage, Vsw, of the respective power switch is below a predetermined threshold, and control a rate of change of voltage at the output for slowly turning ON the respective power switch in response to an ON signal at the first input if the drain-source voltage, Vsw, of the respective power switch is above the predetermined threshold.

Implementations of the above aspects can include one or more of the following features. Turning on or off the respective power switch can include using the switch driver to turn off the respective power switch within a first time duration in response to the OFF signal at the first input, turn on the respective power switch within a second time duration in response to the ON signal at the first input if the drain-source voltage Vsw of the respective power switch is below the predetermined threshold, and control the rate of change of voltage at the output for turning on the respective power switch within a third time duration in response to the ON signal at the first input if the drain-source voltage Vsw of the respective switch is above the predetermined threshold. The first time duration can be less than 33% of the third time duration, and the second time duration can be less than 33% of the third time duration.

The method can include: providing a plurality of switch drivers; providing a gate drive transformer having a primary winding constructed and arranged to receive the switch control signals from the switch timing controller and a plurality of secondary windings; and connecting each secondary winding to the first input of a respective switch driver.

The method can include: providing a plurality of semiconductor switches having the source and drain terminals connected in parallel for predetermined ones of the plurality of power switches; and providing a switch driver for each semiconductor switch in the plurality of semiconductor switches. The drain-source voltage, Vsw, of each predetermined one power switch can be substantially equal to the drain-source voltage, Vds, of each respective semiconductor switch.

The method can further include using a current flowing in an inductive component to reduce the drain terminal voltage of the respective switch prior to turning the respective switch ON.

The method can further include providing a resonant circuit including a transformer for the power train. The switch timing controller can be constructed and arranged to operate the power train such that an output voltage of the power train divided by an input voltage to the power train is a fixed-ratio subject to an output resistance.

The method can further include using a current flowing in the transformer to reduce the drain terminal voltage of the respective switch prior to turning the respective switch ON.

The method can further include providing a plurality of semiconductor switches having the source and drain terminals connected in parallel for predetermined ones of the plurality of power switches and providing a switch driver for each semiconductor switch in the plurality of semiconductor switches.

The method can further include providing an inductive component for the power train. The switch timing controller can be constructed and arranged to operate the power train to control an output variable of the power train.

The switch timing controller can be constructed and arranged to operate the power train to convert power either in a forward direction from an input to an output or in a reverse direction from an output to an input.

The method can further include providing a plurality of semiconductor switches having the source and drain terminals connected in parallel for predetermined ones of the plurality of power switches and providing a switch driver for each semiconductor switch in the plurality of semiconductor switches.

The method can further include using a current flowing in the inductive component to reduce the drain-source voltage, Vsw, of the respective power switch prior to turning the respective switch ON.

The method can further include providing a plurality of semiconductor switches having the source and drain terminals connected in parallel for predetermined ones of the plurality of power switches and providing a switch driver for each semiconductor switch in the plurality of semiconductor switches.

The switch timing controller can be constructed and arranged to operate the power train to control an output voltage.

The switch timing controller can be constructed and arranged to operate the power train to control an output current.

The method can further include: providing a gate drive transformer having a primary winding connected to receive the switch control signals from the switch timing controller and a plurality of secondary windings; providing a plurality of semiconductor switches for predetermined ones of the plurality of power switches; and connecting the semiconductor switches in series to divide the drain-source voltage, Vsw, of each predetermined one power switch, wherein the drain-source voltage, Vds, of each semiconductor switch is a fraction of the drain-source voltage, Vsw, of the predetermined one power switch. The method can further include: providing a respective switch driver for each semiconductor switch; and connecting the first input of each respective switch driver to a respective secondary winding to receive the switch control signals via the gate drive transformer.

The method can further include: providing an auxiliary input for each respective switch driver; connecting the auxiliary input of each respective switch driver to the respective secondary winding; using the switch driver to harness energy in the switch control signals received from the respective secondary winding; and using the energy to operate the respective switch.

The method can further include: providing a plurality of semiconductor switches for predetermined ones of the plurality of power switches; and connecting the semiconductor switches in series to divide the drain-source voltage, Vsw, of each predetermined one power switch, wherein the drain-source voltage, Vds, of each semiconductor switch is a fraction of the drain-source voltage, Vsw, of the predetermined one power switch. The method can further include: providing a respective switch driver for each semiconductor switch; and connecting the first input of each respective switch driver to a respective secondary winding to receive the switch control signals via the gate drive transformer.

The method can further include: providing an auxiliary input for each respective switch driver; connecting the auxiliary input of each respective switch driver to the respective secondary winding; using the switch driver to harness energy in the switch control signals received from the respective secondary winding; and using the energy to operate the respective switch.

The method can further include: providing a second plurality of semiconductor switches for predetermined others of the plurality of power switches; and connecting the semiconductor switches of the second plurality in series to divide the drain-source voltage, Vsw, of each predetermined other power switch. The drain-source voltage, Vds, of each semiconductor switch of the second plurality can be a fraction of the drain-source voltage, Vsw, of the predetermined other power switch. The method can further include: providing a respective switch driver for each semiconductor switch of the second plurality; and connecting the first input of each respective switch driver to a respective secondary winding to receive the switch control signals via the gate drive transformer.

The method can further include: providing an auxiliary input for each respective switch driver; connecting the auxiliary input of each respective switch driver to the respective secondary winding; using each respective switch driver to harness energy in the switch control signals received from the respective secondary winding; and using the energy to operate the respective switch.

The method can further include: setting the predetermined threshold to a voltage that approximates a transition voltage for an output capacitance of the respective switch, such that the output capacitance, Coss, of the respective switch increases exponentially as the drain-to-source voltage decreases below the predetermined threshold.

In general, in another aspect, a method of operating a power converter includes: providing a plurality of power switches to operate a power train, including an inductive component, each power switch having a respective gate, source, and drain terminal, a drain-to-source output capacitance, a drain-source voltage, Vsw, and a transition voltage, Vtr, for the output capacitance, Coss, wherein Coss=c1 when Vsw=Vtr, Coss=c2 when Vsw=40V, and c1=2×c2. The method includes: providing a switch timing controller constructed and arranged to provide ON and OFF switch control signals to operate the power train; and providing a switch driver for operating a respective power switch. The switch driver has a first input for receiving the switch control signals, an output for connection to the gate terminal, a common terminal for connection to the source terminal, and a second input for sensing the drain terminal, of the respective power switch. The method includes: using the switch driver to quickly turn off the respective switch in response to the OFF signal at the first input, turn on the respective switch in response to an ON signal at the first input if the drain-source voltage, Vsw, of the respective switch is below a predetermined threshold, and control a rate of change of voltage at the output for slowly turning ON the respective power switch in response to an ON signal at the first input if the drain-source voltage, Vsw, of the respective switch is above the predetermined threshold. The method includes: setting the predetermined threshold to a voltage greater than the transition voltage for the output capacitance of the respective switch, such that the respective switch is turned ON to discharge its output capacitance, Coss, at a drain-source voltage, Vsw, that approximates the transition voltage.

Implementations of the above aspects can include one or more of the following features. Providing the switch driver can include: providing a first current sink connected to sink a first current from the output in response to an OFF signal at the first input; providing a threshold detector connected to the second input and constructed and arranged to provide a ZVS signal indicating that the voltage Vsw across the switched terminal and the common terminal of its respective output switch is at or below the predetermined threshold; and providing a first current source connected to deliver a first current to the output in response to an ON signal at the first input if the ZVS signal is received from the threshold detector. Providing the switch driver can include: providing a slope detector connected to the second input and constructed and arranged to provide a slope signal indicating the rate of change of the voltage, Vsw, across the switched terminal and the common terminal of its respective switch; and providing a second current source connected to deliver a second current to the output in response to an ON signal at the first input, the second current being adjusted by the slope signal.

Adjusting the second current by the slope signal can include: increasing the time required to turn the respective switch ON slowly after the ON signal is received at the first input for a slope signal indicating an increased rate of change of the switched terminal voltage level; and decreasing the time required to turn the respective switch ON slowly after the ON signal is received at the first input for a slope signal indicating a decreased rate of change of the switched terminal voltage level.

The method can include: providing a gate drive transformer having a primary winding constructed and arranged to receive the switch control signals from the switch timing controller and a plurality of secondary windings; and connecting each secondary winding to the first input of a respective switch driver.

The method can further include: providing a plurality of semiconductor switches having the source and drain terminals connected in parallel for predetermined ones of the plurality of power switches; and providing a switch driver for each semiconductor switch in the plurality of semiconductor switches. The drain-source voltage, Vsw, of each predetermined one power switch can be substantially equal to the drain-source voltage, Vds, of each respective semiconductor switch.

The method can further include using a current flowing in an inductive component to reduce the drain terminal voltage of the respective switch prior to turning the respective switch ON.

The method can further include providing a resonant circuit including a transformer for the power train, and using the switch timing controller to operate the power train such that an output voltage of the power train divided by an input voltage to the power train is a fixed-ratio subject to an output resistance.

The method can further include using a current flowing in the transformer to reduce the drain terminal voltage of the respective switch prior to turning the respective switch ON.

The method can further include providing a plurality of semiconductor switches having the source and drain terminals connected in parallel for predetermined ones of the plurality of power switches and providing a switch driver for each semiconductor switch in the plurality of semiconductor switches.

The method can further include providing an inductive component for the power train. The switch timing controller can be constructed and arranged to operate the power train to control an output variable of the power train.

BRIEF DESCRIPTION OF DRAWINGS

Like reference numbers and symbols in the various drawings indicate like elements.

DETAILED DESCRIPTION

Figure 1:
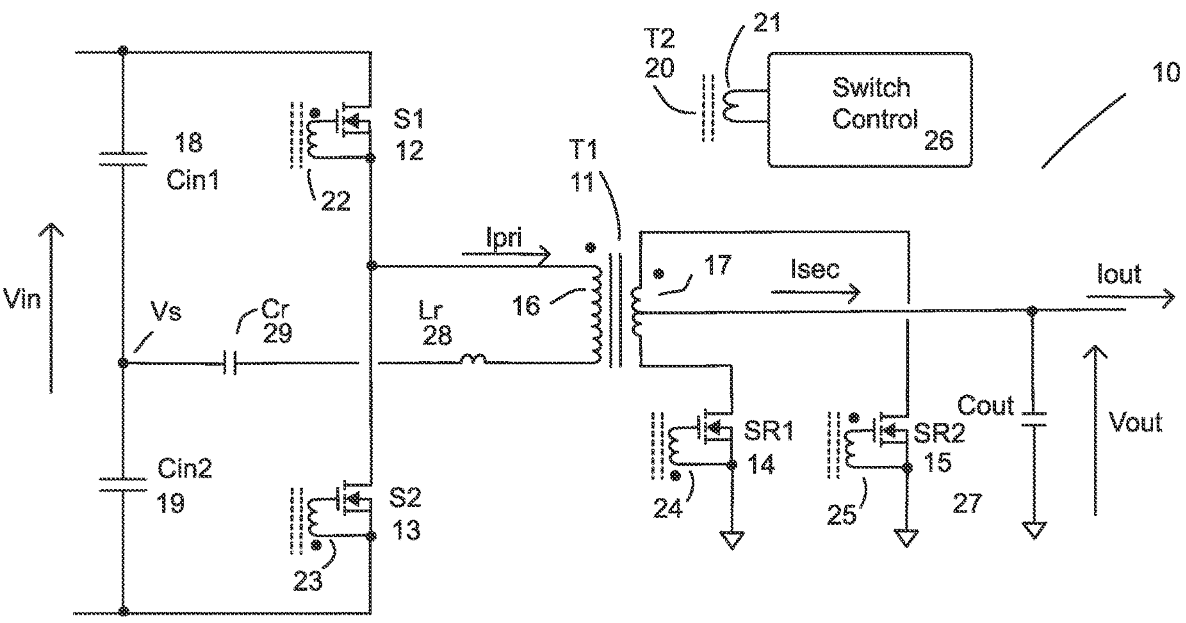
FIG. 1 shows a block diagram of a power converter based upon the SAC topology.

Power converters which function as DC-to-DC transformers called Voltage Transformation Modules ("VTM") and Sine Amplitude Converters ("SAC") which have a transfer function approximating $V_O=K_{VTM}*Vin-Io*R_{VTM}$ (i.e., fixed-ratio converters) are described in Vinciarelli, Factorized Power with Point of Load Sine Amplitude Converters, U.S. Pat. No. 6,930,893, issued Aug. 16, 2005 (the "SAC Patent") and in Vinciarelli, Point of Load Sine Amplitude Converters and Methods, U.S. Pat. No. 7,145,786, issued Dec. 5, 2006 (the "POL SAC Patent") (collectively the "SAC Patents") (both of which are assigned to Vicor Corp. of Andover, MA., and the entire disclosure of each is incorporated herein by reference).

Power converters topologies developed to meet the challenges of delivering high currents in typically small spaces for powering semiconductor loads are described in Vinciarelli, Driver and Output Circuit for Powering Semiconductor Loads, U.S. Pat. No. 10,014,798 issued Jul. 3, 2018 and U.S. Pat. No. 11,018,599 issued May 25, 2021, (the "Remote Driver Patents"); in Vinciarelli et al., Method and Apparatus for Delivering Power to Semiconductors, U.S. Pat. No. 10,158,357 issued Dec. 18, 2018, U.S. Pat. No. 10,998,903 issued May 4, 2021, and U.S. Pat. No. 11,101,795 issued Aug. 24, 2021 (the "MCM Patents"); and in Vinciarelli et al., Method and Apparatus for Delivering Power to Semiconductors, in U.S. Pat. No. 10,277,105 issued Apr. 30, 2019, and U.S. Pat. No. 10,784,765 issued Sep. 22, 2020, and U.S. Pat. No. 11,233,447 issued Jan. 25, 2022 (the "Multi-Rail Patents"); (collectively the "POP Patents") all of which are assigned to Vicor Corporation of Andover, MA., and the entire disclosure of each is incorporated herein by reference.

A power converter having a distributed-output circuit structure, including a plurality of output-cell elements, which may be physically arranged in a step-and-repeat pattern, forming a distributed cell structure (also based upon the SAC topology described in the SAC Patents) is described in Vinciarelli et al., Multi-Cell Power Converter, U.S. Pat. No. 11,271,490 issued Mar. 8, 2022 (the "Multi-Cell Patent"). Additional packaging and interconnection advances for deploying power converters at the point of load are described in Vinciarelli, Delivering Power to Semiconductor Loads, U.S. Pat. No. 10,903,734 issued Jan. 26, 2021, (the "GB Patent") (assigned to Vicor Corp. of Andover, MA., the entire disclosure of which is incorporated herein by reference).

Power converters using multiple switches connected in series to operate as one and equally dividing the voltage impressed across the series connected switches are described in Vinciarelli, Three-Phase AC to SC Isolated Power Conversion with Power Factor Correction, U.S. Pat. No. 11,228,246 issued Jan. 18, 2022 (the "RFM Patent") (assigned to Vicor Corp. of Andover, MA., the entire disclosure of which is incorporated herein by reference).

Circuits for controlling MOSFET switches in power converters, including integrated circuits comprising a control circuit and a controlled MOSFET switch, are described in Vinciarelli et al, Components Having Actively Controlled Circuit Elements, U.S. Pat. No. 6,985,341, issued Jan. 10, 2006, (the "FET Integration Patent") and in Vinciarelli, Controlled Switches for Fault Tolerant Power Converters, U.S. Pat. No. 9,571,084, issued Feb. 14, 2017 (the "FT SW Patent") (both of which are assigned to Vicor Corp. of Andover, MA., and the entire disclosure of each is incorporated herein by reference). Additional circuits and methods for controlling switches in power converters are described in the SAC Patents, the Multi-Cell Patent, as well as in Vinciarelli, Digital Control of Resonant Power Converters, U.S. Pat. No. 9,166,481 issued Oct. 20, 2015 (the "Digital Control Patent"), in Vinciarelli, Adaptive Control of Resonant Power Converters, U.S. Pat. No. 10,020,752 issued Jul. 10, 2018, U.S. Pat. No. 10,153,704 issued Dec. 11, 2018, U.S. Pat. No. 10,637,364 issued Apr. 28, 2020, and U.S. Pat. No. 11,018,594 issued May 25, 2021 (the "ASAC Patents"), and in Vinciarelli et al., Multi-Cell Power Converter, U.S. application Ser. No. 17/475,146 filed Sep. 14, 2021 (the "SDS Application"), all of which are assigned to Vicor Corporation and incorporated here in their entirety by reference.

In general, the control of switches in the resonant power converters described in the above patents typically use a control circuit to establish the ON/OFF timing of the switches. In the SAC Patents, the Digital Control Patent, and the ASAC Patents, the switch controller uses a gate drive transformer to drive the gate capacitances of the power train switches. The magnetizing inductance of the gate drive transformer charges and discharges the gates of the power train switches non-dissipatively. The duration of the power switch transitions are controlled by the magnetizing current flowing in the magnetizing inductance: increases in magnetizing current charges and discharges the gate capacitances faster and increases in gate capacitance increases the required current or duration to transition the power switches. It will be appreciated that the magnetizing inductance of the gate drive transformer determines the slope of the gate drive waveforms. This interdependency requires engineering time to design the gate drive transformer for each power train and manufacturing controls to limit variability in productions runs to ensure proper switch timing.

The remote POL circuits described in the Remote Driver Patents, the MCM Patents, the Multi-Rail Patents, and the Multi-Cell Patents have generally used the non-dissipative gate drive circuitry described in the above referenced patents. The SDS Application describes improved techniques for controlling the secondary switches in the MCM and Multi-Cell type of POL circuits.

The foregoing switch control approaches required engineering resources to design ("tune") the switch control and non-dissipative gate drive to the power train of each variation of the power converter, e.g. for each new input voltage, output voltage, power level, or complement of power train switches. Referring to FIG. 1, a fixed-ratio SAC power train 10 comprising a half-bridge primary circuit coupled to a center-tapped secondary circuit is shown having two primary MOSFET switches, S1 and S2 connected to drive the primary series-resonant circuit, which includes a resonant inductor, Lr 28, (which may include the primary-reflected leakage inductance of transformer T1) and a resonant capacitor, Cr 29. The secondary circuit may include MOSFET switches, SR1 14 and SR2 15, operated as controlled rectifiers. In FIG. 1, each of the primary and secondary switches may be driven directly by a respective winding of a gate drive transformer, e.g. S1 12 is driven by winding 22, S2 13 by winding 23, SR1 14 by 24, and SR2 15 by winding 25. In some embodiments the ground referenced switches could be driven directly from the primary side of the gate drive transformer. From FIG. 1, it should be clear that the magnetizing inductance of the gate drive transformer would need to scale in inverse proportion to the cumulative gate capacitances.

Additional operational challenges are presented by the need to accurately and consistently set the inductance of the gate-drive transformer for mass production. Finally, the gate drive level required by a large power train having a large multiplicity of relatively large switches compared to a small power train having fewer and smaller switches adds additional complexity to the control circuitry, potentially requiring a variety of control chips appropriately scaled to the requirements of the target power train. To illustrate, consider for example, a high voltage, e.g. 400 or 800 VDC, fixed-ratio 25 kW converter which may have three parallel power trains, each having a power transformer, 16 primary switches and 16 secondary switches, for a total of 96 switches. Such a converter using the gate drive techniques described above may require 6 gate drive transformers with a total of 96 secondary gate drive windings. Although the complexity of such a system should be self-evident to those of skill in the art, consider that the designer would need to ensure that all six of the gate drive transformers are appropriately gapped (tuned) to operate all 96 switches in concert to achieve voltage and current sharing and achieve zero voltage switching. Additionally, the switch controller in such a system would likely require external drivers (or be appropriately scaled up in size) to handle the large load presented by the large number of switches.

Driver Circuit Operation Summary

Figure 2:
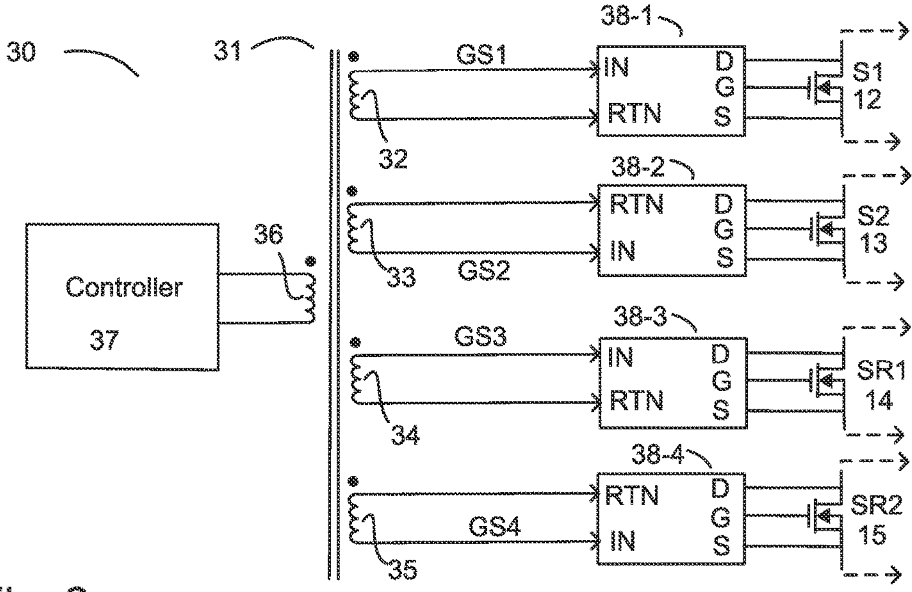
FIG. 2 shows a functional block diagram of improved gate drive system for the power converter of FIG. 1.

Referring to FIG. 2, an improved gate drive system 30 is shown for the SAC power train of FIG. 1 in which the direct connection between the gate drive transformer secondary windings, e.g. windings 22, 23, 24, 25, and the power switches, 12, 13, 14, 15, respectively is replaced with a driver circuit, 38-1, 38-2, 38-3, 38-4, inserted in between. As shown in FIG. 2, the switch controller 37 may drive the primary winding 36 of gate drive transformer 31. Four secondary gate drive windings, 32, 33, 34, and 35, may be coupled to the inputs of driver circuits, 38-1, 38-2, 38-3, and 38-4, as shown, the outputs of which may control the gates of the four respective power switches, S1 12, S2 13, SR1 14, and SR2 15, respectively. The driver circuits, 38-1, 38-2, 38-3, and 38-4, may preferably have multi-level drive outputs for operating the power MOSFET switches as described in greater detail below. For example, each driver 38-1, 38-2, 38-3, and 38-4 may turn its respective controlled switch (1) OFF rapidly in response to an OFF signal from the transformer; (2) ON slowly in response to an ON signal if predetermined conditions for the power MOSFET, e.g. ZVS conditions, do not exist; and (3) change the gate drive during turn ON, i.e. after receipt of an ON signal from slow to fast, after the predetermined conditions are established, e.g. the drain-source voltage is below a predetermined level. Optionally, the delay represented by the slow turn ON in (2) above may be adjusted as a function of whether the controlled switch is actively transitioning to a voltage minimum, i.e. for ZVS operation. The driver circuits allow for simplified design and manufacturing of the gate drive transformer and eliminate the need for tuning the system as described above.

In some implementations, the OFF signal can be defined as a voltage signal across the respective secondary winding of the gate drive transformer that is less than a predetermined threshold, e.g., "IN Threshold," i.e., when Vin<"IN Threshold", and the ON signal can be defined as a voltage signal across the respective secondary winding of the gate drive transformer that is equal to or greater than the predetermined threshold, e.g., "IN Threshold," i.e., when Vin≥"IN Threshold".

In this document, the terms "slow" and "quick" are relative terms. When we say that a driver circuit is configured to turn a switch OFF quickly under a first operation condition, turn the switch ON slowly under a second operation condition, and turn the switch ON quickly under a third operation condition, we mean that the amount of time t1 used to turn the switch OFF under the first operation condition is shorter than the amount of time t2 used to turn the switch ON under the second operation condition, and the amount of time t3 used to turn the switch ON under the third operation condition is shorter than the amount of time t2 used to turn the switch ON under the second operation condition. For example, t1 can be less than 20% of t2, and t3 can be less than 20% of t2. For example, in some implementations, an SAC converter that includes the SAC power train 10 operates at a converter operating frequency of about 2 MHz, t1 can be in a range from 2nS to 6nS, t2 can be in a range from 20nS to 40nS, and t3 can be in a range from 2nS to 6nS. It is understood that the converter can operate at other frequencies, and the time durations t1, t2, and t3 can be adjusted accordingly.

The gate of a power MOSFET switch may be called a switch control terminal, the source of a power MOSFET switch may be called a common terminal, the drain of a power MOSFET switch may be called a switched terminal, and the voltage across the switched terminal and the common terminal may be called Vsw.

In some implementations, a power converter can have multiple stages that include a switching power conversion stage, and the SAC power train 10 can be part of the switching power conversion stage.

In FIG. 2, the switch timing controller 37 drives the gate drive transformer to generate ON and OFF commands for the driver circuits, which turn the switches ON and OFF using the multi-level drive protocol described above. In this document, the terms "ON command" and "ON signal" are used interchangeably, and the terms "OFF command" and "OFF signal" are used interchangeably. For example, the switch timing controller 37 may send timing signals via a gate drive transformer to respective driver circuits. A signal across a secondary winding of the gate drive transformer that produces a positive voltage across the input terminal IN and the input return terminal RTN is an ON signal for the respective driver circuit. Similarly, an OFF signal is one imparting a negative voltage across the input terminal IN and the input return terminal RTN of the driver circuit. The polarity with which a driver circuit is connected to a secondary winding may be used to determine whether an ON or OFF signal is received in response to a positive signal on the primary winding of the gate drive transformer.

In the example of FIG. 2, the input terminal IN and the input return terminal RTN for the driver circuit 38-2 are connected in reverse polarity compared to the input terminal IN and the input return terminal RTN for the driver circuit 38-1. Thus, in response to a signal from the controller 37 to the primary winding 36 of the gate drive transformer 31, driver circuit 38-1 may receive via its respective secondary winding 32, an ON signal (i.e., the voltage at the input terminal IN is greater than the voltage at the input return terminal RTN); while driver circuit 38-2 may receive via its respective secondary winding 33, the complementary OFF signal (i.e., the voltage at the input terminal IN is less than the voltage at the input return terminal RTN). Thus the driver circuit 38-1 will turn ON switch S1 12, and driver circuit 38-2 will turn OFF the switch S2 13. Similarly, secondary windings 34 and 35 send complementary signals to their respective driver circuits 38-3 and 38-4.

For some of the examples described in this document, when we say that the switch timing controller sends ON and OFF signals to the primary winding of the gate drive transformer, we mean that the switch timing controller drives the primary winding of the gate drive transformer with a positive or negative polarity signal depending on the converter phase of operation. When we say that the driver circuit receives ON and OFF signals at a driver input, we mean that the driver circuit receive an ON signal and an OFF signal at the driver input at different times according to the polarity of its connections. Such ON and OFF signals may be regarded as timing signals used to operate the switches in a series of converter operating cycles.

Figure 4:
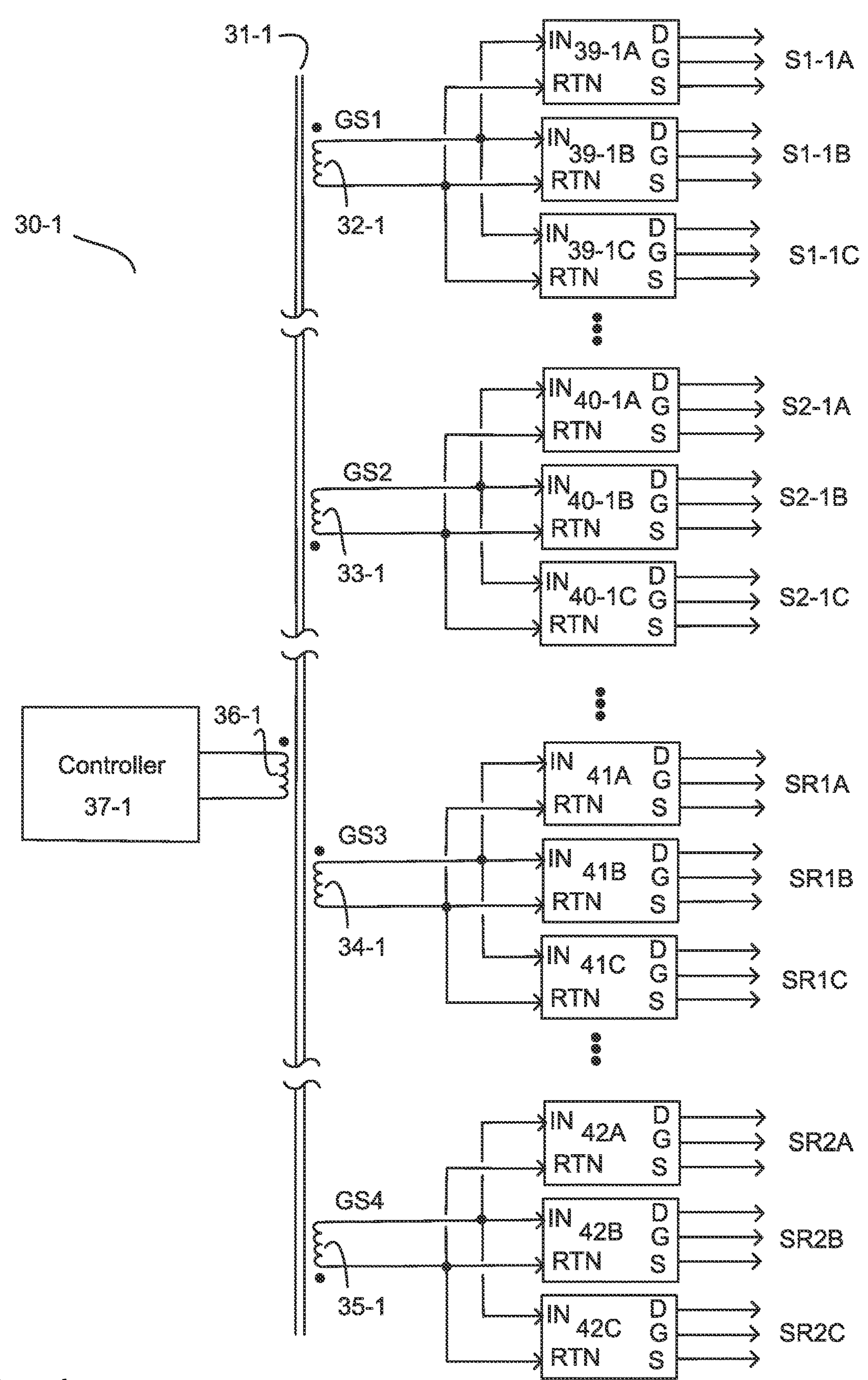
FIG. 4 shows an improved gate drive system for the power converter of FIG. 3.

Although FIG. 2 shows each controlled switch being operated by a single dedicated winding not shared by other driver circuits and switches; it should be appreciated that each secondary winding may be connected to operate a plurality of driver circuits, each of which may control a respective controlled switch, e.g. as shown in FIG. 4 and described in greater detail below.

Driver Chip Functional Blocks

Figure 5:
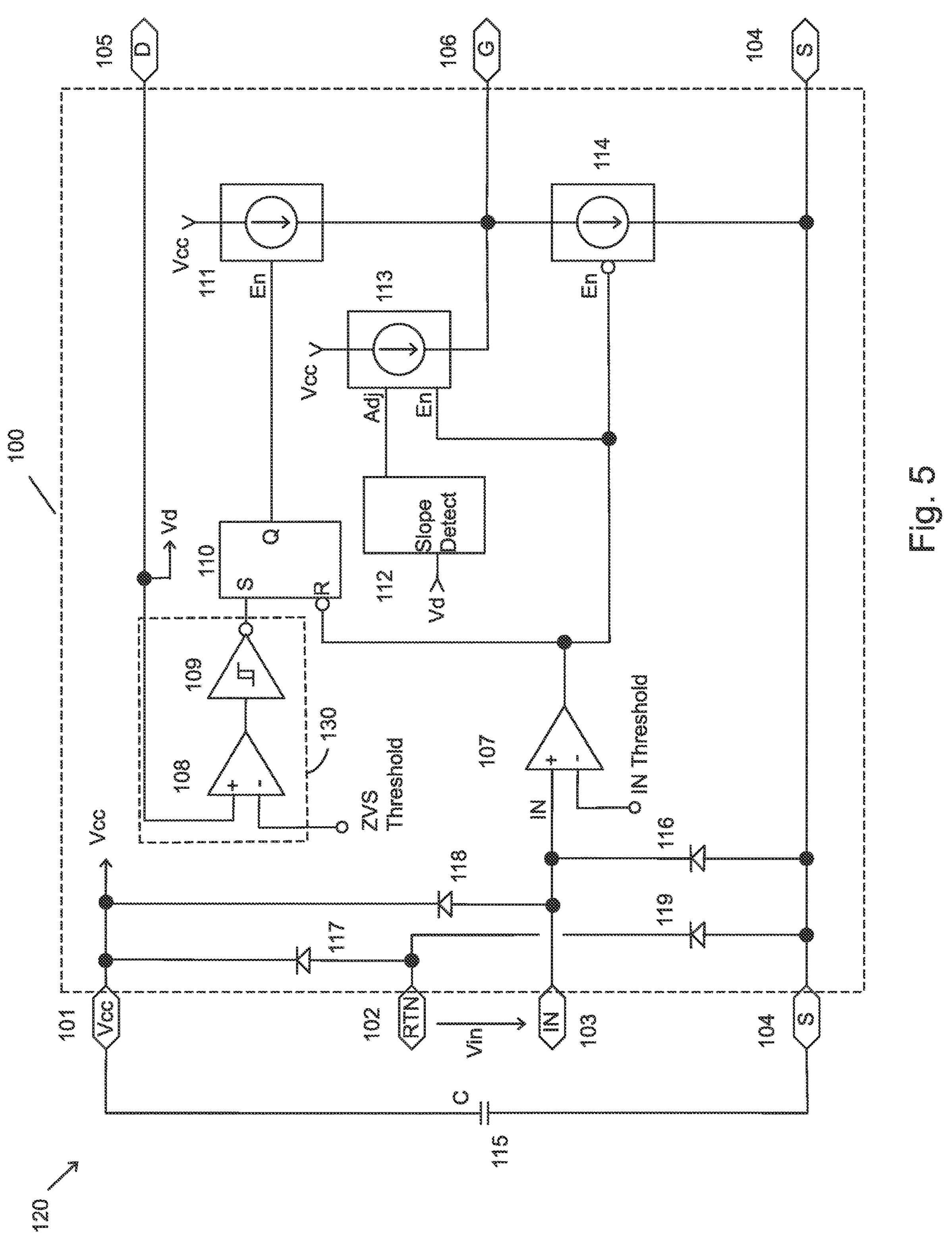
FIG. 5 shows a function block diagram of an improved gate drive circuit.

Referring to the block diagram of FIG. 5, representative functional blocks of a driver circuit 120 is shown including a driver chip 100 and an external capacitor 115. The driver circuit 120 of FIG. 5 is representative of each of the driver circuits 38-1, 38-2, 38-3, and 38-4 of FIG. 2. The driver chip may have six terminals as shown in FIG. 5 including a bias terminal VCC 101, an input terminal IN 103, an input return terminal RTN 102, and three terminals S 104, D 105, and G 106 for connection to the Source, Drain, and Gate of the controlled device, e.g. a controlled MOSFET switch. The IN 103 and RTN 102 terminals are for connection to a respective gate drive transformer winding, e.g. 32, 33, 34, 35 as shown in FIGS. 2, and 32-1, 33-1, 34-1, 35-1 as shown in FIG. 4. The bias terminal VCC 101 is for connection to a capacitance, e.g. capacitor 115, to provide energy storage for operation of the driver circuit as explained in greater detail below. The capacitance may be external to the driver chip 100 as shown in FIG. 5, or alternatively may be co-packaged with, or internal to, the chip 100.

Amplifier 107 is shown having a non-inverting input connected to the input (IN) terminal 103 and an inverting input connected to receive a reference signal, "IN Threshold." When the input signal (i.e., Vin, which is the voltage across the terminals 103 and 102) exceeds the IN threshold, the output of amplifier 107 may go high, which may be used to reset SR flip-flop 110, enable current source 113, and disable current sink 114, as shown in FIG. 5.

A ZVS threshold amplifier 130, which includes a comparator 108 and a buffer 109 implementing a hysteresis function, may be used to generate a control signal for the set(S) input of the flip-flop 110. The comparator 108 may have a non-inverting input connected to the drain (D) terminal 105, an inverting input connected to a reference signal, "ZVS Threshold," and an output connected to the hysteresis function unit 109, which in turn may have an output connected to the set(S) input of flip-flop 110. The current source 111 is enabled when the flip-flop 110 is set (Q is high) and disabled when reset (Q is low). As the drain-to-source voltage falls below the ZVS threshold, the output of the ZVS threshold amplifier 130 goes high setting the SR flip-flop 110 and enabling current source 111 provided the flip-flop 110 is not being held in the reset state by amplifier 107. Because the "ZVS Threshold" reference signal can be a small, non-zero value, e.g., 1V, 2V, or 3V, the term "ZVS" depending on context can represent turning the respective switch ON when a low, rather than zero, voltage is across the switch. The term "ZVS signal" can refer to a signal indicating whether the drain-to-source voltage is below a predetermined threshold, e.g., 1V, 2V, or 3V for primary side switches and secondary side switches. In some implementations, the threshold voltage for the primary side switches can be the same as the threshold voltage for the secondary side switches. In some implementations, the threshold voltage for the primary side switches can be different from the threshold voltage for the secondary side switches. The ZVS threshold can be set according to the needs of the switching devices and the application.

An optional slope detection circuit 112 may have an input connected to sense the rate of change of the drain-to-source voltage, Vds, and an output connected to provide an adjustment signal to the current source 113. Current source 113 may accordingly adjust its output current as a function of the slope signal. In some examples, the current source 113 can be configured to reduce the output current (and thereby increase the time required to turn the semiconductor switch ON slowly) when the slope signal indicates an increased rate of change of the drain terminal voltage level. This provides more time for the drain terminal voltage to be reduced to below the threshold voltage. In some examples, the current source 113 can be configured to increase the output current (and thereby decrease the time required to turn the semiconductor switch ON slowly) when the slope signal indicates a decreased rate of change of the drain terminal voltage level. A decreased rate of change of the drain terminal voltage level indicates that the voltage of the drain terminal will not change very much, so the current source 113 increases the output current to speed up turning ON of the semiconductor switch.

As shown in FIG. 5, the two current sources 111 and 113 and the current sink 114 are connected to either source current to or sink current from the gate terminal G 106, with respect to the source(S) terminal, to turn the controlled switch ON and OFF.

Rectification circuitry, including representative devices 116, 117, 118 and 119 functionally represent full wave rectification circuitry that uses power from the gate drive winding to charge capacitor 115 connected between the bias (VCC) terminal 101, and the source (S) terminal 104. Power to charge the gate of the controlled switch via the gate terminal 106 is provided by the capacitor 115 via the VCC terminal 101 with respect to the source(S) terminal 104. It should be understood that the IN and RTN terminals 103 and 102 of each driver circuit 120 would be connected to a respective secondary winding of the gate drive transformer (31 in FIG. 2; 31-1 in FIG. 4), e.g. as shown in FIGS. 2 and 4. Diode 119 shown connected between the return terminal 102 and the source terminal 104 clamps the return terminal 102 to the voltage of the source terminal 104 during OFF commands, i.e. when the voltage of the return terminal 102 is less than the voltage of the source terminal 104.

The duty cycles of complementary power switches are approximately equal in the SAC power train topology and the ON time of each power switch is less than or equal to its OFF time, enabling a single gate drive transformer to be used for complementary switches. The voltage across the secondary winding of the gate drive transformer, which is positive during the ON command and negative during the OFF command for each switch, may, through rectification circuitry (e.g. rectifiers 116 and 117), be used to charge the bias capacitor 115 (FIG. 5). The driver circuit 120 thus uses power supplied by the gate drive transformer to operate the circuitry and the controlled switches. Although rectifiers 116 and 117 in FIG. 5 show only single-phase rectification during the OFF commands, i.e. the voltage across the transformer winding is negative (in which the voltage at the terminal 103 is less than the voltage at the terminal 102 such that the rectification circuitry represented by the devices 117 and 116 are forward biased), full wave rectification may be provided to charge capacitor 115 during both phases, i.e. during ON and OFF commands. It should be appreciated that capacitor 115 will be charged to the voltage provided by the gate drive transformer less the applicable forward voltage drop(s) of the rectification circuitry represented by the devices 117 and 116. Switches operated as synchronous rectifiers may be used in the rectification circuitry, e.g. in parallel with diodes 116 and 117 to reduce any forward voltage drop and maximize the bias voltage across the capacitor. The bias voltage across capacitor 115 tracking the voltage across the gate drive transformer allows the switch controller, e.g. 37 (FIG. 2) and 37-1 (FIG. 4), to control the gate drive level for the controlled switches, e.g. as described in the SAC Patents to limit in-rush current or otherwise control the output resistance of the power train. Capacitor 115 will be charged after a sufficient number of ON/OFF command cycles of the gate drive transformer, allowing it to supply bias current to the driver circuit 100 for use in turning ON the controlled switch under the described conditions. The following description of the operation of the driver circuit assumes the capacitor 115 had been charged in the manner described above.

Driver Chip Operation

The operation of the driver circuit 120 will be described with reference to FIG. 5. An ON command may be defined as Vin (the voltage across the gate drive winding) being greater than a predetermined threshold, e.g. the IN Threshold, i.e. the IN terminal is more positive than the RTN terminal by at least the IN Threshold. In response to an ON command, the output of comparator 107 goes high, which disables current sink 114 and enables the current source 113. Current source 113 is a relatively low current source used to slowly charge the gate of the controlled device through the G terminal, 106, at a current level that may set a maximum delay for turning the controlled device ON under predetermined circumstances. For example, in a SAC converter having a converter operating frequency of 2 MHz, current source 113 may charge the gate of the controlled device sufficiently to turn it ON within 20-30 nanoseconds following the ON command. The low current source 113 may accordingly set a maximum delay from the ON command for turning the controlled device ON under non-ZVS conditions.

Optionally the output current of current source 113 may be adjusted to extend the delay depending upon changes in the drain-to-source voltage, Vds, of the controlled device. For example, the optional slope detector, 112, may provide an output that changes as a function of the rate of change of Vds, e.g. the output may be proportional to dVds/dt. The current source 113 may optionally include, as shown an adjustment input that functions to reduce the source current in response to the output of the slope detector 112. In some examples, when the slope detector 112 outputs a higher value, the current source 113 in response outputs a lower source current. A higher slope value indicates that the drain-to-source voltage is still changing rapidly, so lowering the source current provided by the current source 113 will provide more time to allow the drain-to-source voltage to be further reduced, preferably to below the threshold voltage. In some examples, when the slope detector 112 outputs a lower value, the current source 113 in response outputs a higher source current. A lower slope value indicates that the drain-to-source voltage is not likely to change much so there is not much advantage in waiting further for the drain-to-source voltage to be further reduced, thus increasing the source current provided by the current source 113 will speed up the turning ON of the switch. The combination may adjust the level of current sourced by current source 113 according to the rate of change of the voltage at the D terminal, 105, with respect to the voltage at the S terminal, 104, i.e. the rate of change of the drain-to-source voltage, Vds, of the controlled device. In other words, the slope detection 112 and adjustment circuitry function to extend the maximum ON delay, providing additional time, for the drain-to-source voltage of the controlled device to decrease if a ZVS transition is in progress.

For ZVS conditions detected after the ON command, current source 111 supplies a relatively high current to rapidly charge the gate of the controlled device quickly turning it ON. When the drain-to-source voltage, Vds, (between the D and S terminals, 105, 104 respectively) of the controlled device falls below the predetermined "ZVS threshold," the output of ZVS threshold amplifier 130 goes high setting the SR flip-flop 110, whose output Q goes high, turning ON the high-current source 111. Buffer 109 shown connected between comparator 108 and flip-flop 110 represents preferred hysteresis filtering for the ZVS threshold amplifier 130.

While in an OFF-command state (defined as the voltage across the respective secondary winding of the gate drive transformer being less than the predetermined threshold "IN Threshold," i.e., Vin is less than the IN Threshold), the output of comparator 107 remains low enabling current sink 114, disabling adjustable current source 113, and maintaining the SR flip-flop 110 in a reset state, which in turn disables the high-current sources 111. In this state, the current sink 114 rapidly discharges the gate of the controlled device turning it OFF quickly and preventing the current sources 111 and 113 from turning on the controlled device until after an ON command is received.

Bidirectional power converters are described in, e.g., U.S. Pat. No. 7,154,250 (e.g., column 22, lines 33 to 67 and FIG. 29), U.S. Pat. No. 6,975,098 (e.g., column 6, line 59 to column 7, line 7), and U.S. Pat. No. 6,984,965 (e.g., column 32, lines 41 to column 33, line 40). The entire disclosures of the above patents, all assigned to Vicor Corp. of Andover, MA., are incorporated herein by reference. In some implementations, the controller 37 of FIG. 2, controller 37-1 of FIG. 4, and controller 57 of FIG. 6 can be constructed and arranged to operate the power train to convert power either in a forward direction from an input to an output or in a reverse direction from an output to an input, using the techniques described in U.S. Pat. Nos. 7,154,250, 6,975,098, and 6,984,965.

High Voltage High-Power Converter Example

Figure 3:
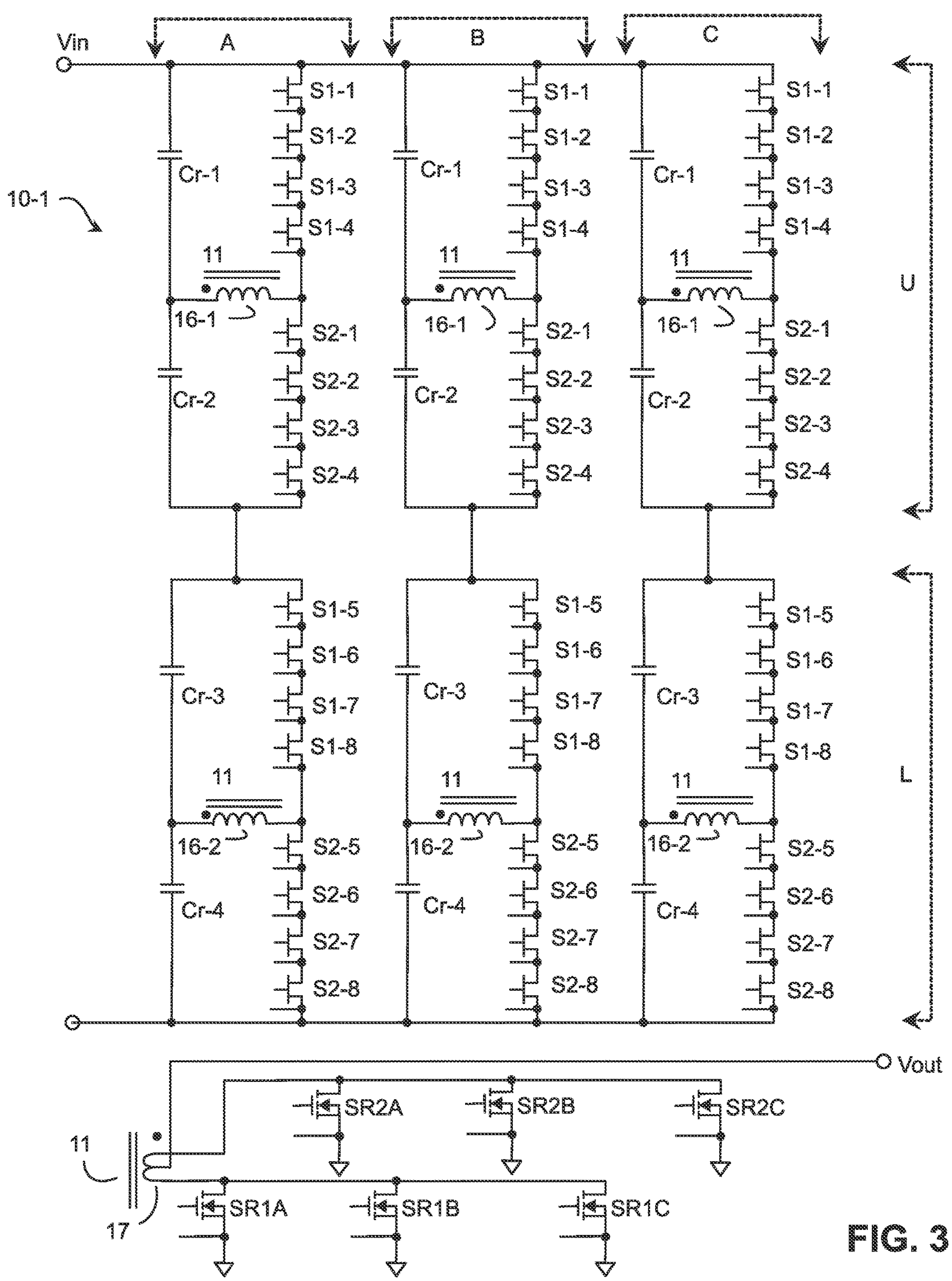
FIG. 3 shows a high-power fixed-ratio converter based upon the SAC topology.

Referring to FIGS. 3 and 4, a larger more-complex high input-voltage (e.g. 400 VDC or 800 VDC) fixed-ratio high-power (e.g. 25 kW) power train example is shown having a large multiplicity of primary (e.g. 48) and secondary power switches. As shown the converter may have three parallel power trains, e.g. power trains A, B, and C, each of which may have two primary cells, e.g. upper primary cell, U, and lower primary cell, L. Each primary cell, U, L, may have a primary winding, e.g. primary windings 16-1AU, 16-2AL, 16-1BU, 16-2BL, 16-1CU, 16-2CL, coupled to a power transformer, 11. As shown, each primary cell may have a plurality of primary switches connected and operated to divide the input voltage. For example, eight primary switches are shown for each primary cell, e.g. as shown upper primary cell AU includes switches S1-1AU, S1-2AU, S1-3AU, S1-4AU, S2-1AU, S2-2AU, S2-3AU, S2-4AU, and lower primary cell AL includes switches S1-1AL, S1-2AL, S1-3AL, S1-4AL, S2-1AL, S2-2AL, S2-3AL, and S2-4AL. Each power train may include a plurality of output cells including a plurality of secondary switches. To avoid unnecessary complexity in FIG. 3, a single center-tapped secondary winding, 17, is shown connected to a plurality of output switches SR1A, SR2A, SR1B, SR2B, SR3A, SR3B. For simplicity and illustration purposes, two secondary switches SR1, SR2 are shown for each power train, A, B, C, one for each output phase, resulting in six secondary switches SR1A, SR1B, SR2A, SR2B, SR3A, SR3B. In practice however, each of the switches may represent a plurality, e.g. eight, of parallel connected switches, for a total of 48 secondary switches and a total of 96 switches in the power train shown. In practice, the secondary switches may be distributed in areas of the power converter immediately adjacent the output terminals, which in some converters may include two or more sides of the converter. Additionally, the secondary winding 17 may include a plurality of secondary windings connected in parallel within each power train or across power trains as desired.

In the example of FIG. 3, the semiconductor switches S1-1, S1-2, S1-3, S1-4 together effectively function equivalent to a power switch that has a drain-to-source voltage Vsw equal to the voltage across the drain of the switch S1-1 and the source of the switch S1-4. The semiconductor switches S2-1, S2-2, S2-3, S2-4 together effectively function equivalent to a power switch that has a drain-to-source voltage Vsw equal to the voltage across the drain of the switch S2-1 and the source of the switch S2-4. The semiconductor switches S1-5, S1-6, S1-7, S1-8 together effectively function equivalent to a power switch that has a drain-to-source voltage Vsw equal to the voltage across the drain of the switch S1-5 and the source of the switch S1-8. The semiconductor switches S2-5, S2-6, S2-7, S2-8 together effectively function equivalent to a power switch that has a drain-to-source voltage Vsw equal to the voltage across the drain of the switch S2-5 and the source of the switch S2-8. The drain-to-source voltage Vds of each semiconductor switch is a fraction of the drain-to-source voltage Vsw of the power switch.

Referring to FIG. 4, an example of a switch controller 30-1 for the power train 10-1 of FIG. 3 is shown having a controller 37-1 connected to drive the primary winding 36-1 of a gate drive transformer 31-1. As shown, each secondary winding of the gate-drive transformer, e.g. secondary windings 32-1, 33-1, 34-1, 35-1, may be coupled to a plurality, e.g., three, of respective driver circuits, e.g. one driver circuit for the respective switch in each of the power trains. For shared gate-drive windings, the controlled switches on each gate-drive winding should be at approximately the same potential during operation of the power train. To illustrate, winding 32-1 is shown driving control circuits 39-1A, 39-1B, and 39-1C, which are connected to drive respective switches S1-1 in the upper cell (U) of each power train (A, B, C), e.g. switches S1-1A, S1-1B, and S1-1C respectively, which all will be at approximately the same potential during operation. Similarly, winding 33-1 is shown connected to the inputs of driver circuits, 40-1A, 40-1B, and 40-1C, which respectively drive switches S2-1 in the upper cell (U) of each power train (A, B, C), e.g. switches S2-1A, S2-1B, and S2-1C respectively. The pattern may be repeated for all of the primary switches in the power train 10-1 of FIG. 3. For example, switches S1-2 from cells AU, BU, CU, e.g. S1-2A, S1-2B, and S1-2C, may be grouped and have their respective driver circuits driven by a common gate drive winding, e.g. winding 32-2 (not shown). Similarly, the following groups of switches may be driven in the same manner by having their respective driver circuits connected to a respective winding for the group: S1-3 A, B, C by winding 32-3 (not shown); S1-4 A, B, C by winding 32-4 (not shown); S1-5 A, B, C by winding 32-5 (not shown); S1-6 A, B, C by winding 32-6 (not shown); S1-7 A, B, C by winding 32-7 (not shown); S1-8 A, B, C by winding 32-8 (not shown); S2-2 A, B, C by winding 33-2 (not shown); S2-3 A, B, C by winding 33-3 (not shown); S2-4 A, B, C by winding 33-4 (not shown); S2-5 A, B, C by winding 33-5 (not shown); S2-6 A, B, C by winding 33-6 (not shown); S2-7 A, B, C by winding 33-7 (not shown); and S2-8 A, B, C by winding 33-8 (not shown). A similar scheme may be used to drive the secondary switches: for example, gate-drive winding 34-1 may be connected to the driver circuits 41A, 41B, 41C for switches SR1 A, B, C respectively; and gate-drive winding 35-1 may be connected to driver circuits 42A, 42B, 42C for switches SR2 A, B, C, respectively. Additional windings may be provided to drive additional groups of secondary switches, e.g. each winding may drive a respective group, e.g. three, secondary switches. A single driver circuit 120 may also be used to control a plurality of switches connected in parallel, i.e. switches having their source, gate, and drain terminals respectively connected together.

In FIG. 4, the switch timing controller 37-1 drives the gate drive transformer 31-1 to generate ON and OFF signals for the driver circuits (e.g., 39-1A, 39-1B, 39-1C, . . . 40-1A, 40-1B, 40-1C, . . . 41A, 41B, 41C, . . . 42A, 42B, 42C), which turn the switches (e.g., S1-1A, S1-1B, S1-1C, . . . , S2-1A, S2-1B, S2-1C, . . . , SR1A, SR1B, SR1C, . . . , SR2A, SR2B, SR2C) ON and OFF using the multi-level drive protocol described above. The gate drive transformer 31-1 generates the ON signal by generating a positive voltage across the secondary winding of the gate drive transformer and generates the OFF signal by generating a negative voltage across the secondary winding of the gate drive transformer. The ON and OFF signals can be considered timing signals that are used to operate the power train 10-1 in a series of converter operating cycles.

Although switch timing controller 37-1 is shown driving a single gate drive transformer 31-1 in FIG. 4, it may be preferable to use two gate drive transformers to reduce the number of secondary windings required on each transformer. For example, in the ninety-six switch power train 10-1, thirty two secondary windings would be required of a single transformer compared to sixteen secondary windings using two gate drive transformers. Reducing the number of windings may simplify fabrication, e.g. reducing the number of PCB layers required by the gate drive transformer(s).

Compared with the prior art approach, the 25 kW converter example of FIGS. 3 and 4 using the driver circuits reduces the number of gate-drive transformers from 6 to 2 and greatly simplifies the gate drive transformer design and manufacturability. Providing logic in the driver circuit, for optimizing switch timing for ZVS operation, eliminates the need to: precisely control the magnetizing inductance of the gate drive transformer, precisely control the magnitude of the peak magnetizing current, and precisely control the timing of the magnetizing current waveform. This reduces the peak gate drive current required and eliminates the need for complex gate drive waveforms coordinated with the power train operation. Furthermore, providing logic in the driver circuit, for optimizing switch timing for ZVS operation, also eliminates the need to match the gate drive transformer to the gate charge characteristics of the power train MOSFETs.

The gate drive transformers used with the driver circuits need only convey ON and OFF commands, e.g. using square waves which reduces peak current requirements (compared to the triangular wave form in the resonant approach) and requires only a minimal or negligible gap in the magnetic medium. The driver circuit turns the controlled switches OFF quickly, e.g. within 5 nS of the OFF command, and ON at the right time based upon the voltage transition across the switch. Thus, the gate transition timing is no longer controlled by current in the gate drive transformer, instead the logic built into the driver circuit controls the switch timing. The driver circuits therefore ease the design of the gate drive transformer and gate drive circuitry. Tuning of gate drive transformer inductance with MOSFET gate capacitance and charge is eliminated along with precise gap requirements, greatly simplifying the design and improving manufacturability, e.g. gap tolerances are eliminated, improving production yield and lowering cost. As noted above, the peak current required by the gate drive transformer is greatly reduced using the driver circuit, e.g. 5 A peak magnetizing current to achieve a 100nS switch transition in the resonant approach compared to 0.5 A per switch using the driver circuit.

Using the driver circuits, the gate energy recycling used in the methods described in the SAC Patents (and others) is sacrificed in favor of directly driving each power switch to change state (switch transition) faster. However, using better figure of merit switches (reduced threshold voltages and gate capacitances), the power lost in dissipatively driving the gates is more than offset by increased efficiency in the power train. For example, reducing the switch transitions relative to the resonant gate drive approach may improve the duty cycle of the power train, reduce its effective output resistance, and decrease its peak current, thus improving power train utilization.

In the SAC and other ZVS topologies, the duration of the switch transitions depends upon the current, e.g. magnetizing current, available at the end of a power transfer interval to charge and discharge the output capacitance of the switches and any other parasitic capacitances in the circuit. In a typical MOSFET, the output capacitance, Coss, is a function of drain-to-source voltage, Vds. As shown in the simplified curves of output capacitance, Coss, vs. drain-to-source voltage, Vds, in FIG. 7, the output capacitance is relatively low and constant for drain-to-source voltages above an inflection point, the transition voltage, Vtr, and begins to increase steeply as the drain-to-source voltage, Vds, decreases below the inflection point, Vtr. In other words, the output capacitance, Coss, at low drain-to-source voltages, Vds, may be significantly higher than at higher drain-to-source voltages. Thus, as the drain-to-source voltage (Vds) across each switch to be turned ON decreases toward zero, the rate of change of Vds may also decrease due to the finite magnetizing current, and the output capacitance may increase, thereby increasing the duration of the switch transitions (energy recycling intervals, ZVS intervals, dead time, etc.).

Using the driver circuit described above, an improved balance may be struck between the duration of the switch transitions, which impacts the duty cycle of the power train on the one hand, and the switching losses, which are a function of the voltage across the switches and the capacitance at the switching node (typically dominated by Coss of the switches being turned ON) when they are turned ON. For example, reducing the duration of the switch transition can increase the effective power train duty cycle. The switching loss is approximately proportional to $Coss*Vds^2$. The ZVS threshold of the driver may be set to balance the duration of the switch transitions with non-zero-voltage switching losses (the amount of energy dissipated in the switched capacitances, e.g. Coss, each time the switches are turned ON). For example, the ZVS threshold may be increased to reduce the ZVS transition time and increase the effective power train duty cycle (at the expense of switching losses due to non-zero-voltage turn ON of the switches); or conversely the ZVS threshold may be decreased to reduce switching losses (at the expense of duty cycle). Ideally, the ZVS threshold is set to a level that balances switching losses with duty cycle at an operating frequency that is high enough for the desired power or current density of the converter.

Using the driver circuit (39-1A, 39-1B, 39-1C, 40-1A, 40-1B, 40-1C, 41A, 41B, 41C, 42A, 42B, 42C in FIG. 4, 120 in FIG. 5) for series-connected switches, such as the primary switches shown in the high-voltage high-power converter of FIGS. 3 and 4, can have several advantages. The driver circuit may be used to greatly reduce timing errors among series-connected switches. The gate threshold voltage for turning MOSFETs ON is typically specified in terms of a typical value that may fall anywhere within a relatively broad range of acceptable values. For example, a commercial MOSFET may have a threshold voltage specified as 2 Volts typical, but which may fall anywhere in a range from 1 Volt minimum to 3 Volts maximum. Because of the variability of the gate threshold voltage among samples of the same part from the same manufacturer, control of several such switches connected in series, e.g. as shown in FIG. 3, using conventional gate drive techniques, e.g. as described in the RFM Patent, may produce timing errors. Consider for example, that one of the switches may exhibit a gate threshold on the low side of the range while another may exhibit a gate threshold on the high-side. In such a case, the high-threshold switch may turn from ON to OFF earlier than the low-threshold switch, causing it to experience a greater than equal share of the divided voltage until the other switch(es) turn OFF. Timing errors on the scale of twenty to thirty nano-seconds (20-30 nS) may result in such a system operating at 1-2 MHz. In a converter using the driver circuits described above, each of the series-connected switches may be turned OFF very quickly (within a few nano-seconds) irrespective of any normal differences in the gate threshold voltages, thereby reducing the timing errors among the series-connected switches to within fractions of a nano-second, an order of magnitude or two less than the timing errors of a device using the conventional technique.

A switching device considered for power conversion applications is the super junction FET ("SJFET"). However, despite their relatively low ON resistance benefit, SJ-FETs suffer from exceedingly large output capacitance, Coss, which, like in other MOSFETs, is relatively constant at high drain-to-source voltages but increases exponentially as the drain-to-source voltage, Vds, decreases below an inflection point, the transition voltage. In some implementations, The SJFET is configured such that the absolute value of the second derivative of the output capacitance Coss vs. Vds curve (140 in FIG. 7) is greater than zero as the drain-to-source voltage Vds decreases below the transition voltage, for at least a certain range of the drain-to-source voltage Vds. However, in the SJFET, Coss may increase by as much as two orders of magnitude from the relatively constant range, as Vds drops below the transition voltage, Vtr, negatively impacting to an even greater extent, the switching losses and/or duration of the switch transitions. In some examples, the output capacitance Coss can increase by 10 times, 100 times, or more, as compared to the Coss value when Vds is at the transition voltage, as the drain-to-source voltage Vds decreases from the transition voltage to near 0V. Typically, device manufacturers strive to achieve a balance of low on resistance, Rds-ON and output capacitance, Coss. However, most SJFETs available on the market exhibit Coss transition voltages, Vtr, that are too high for efficient use in power trains operating at high frequencies (e.g., 2 MHz are higher), relegating SJFETs to lower frequency (and thus lower power density) converters.

Figure 7:
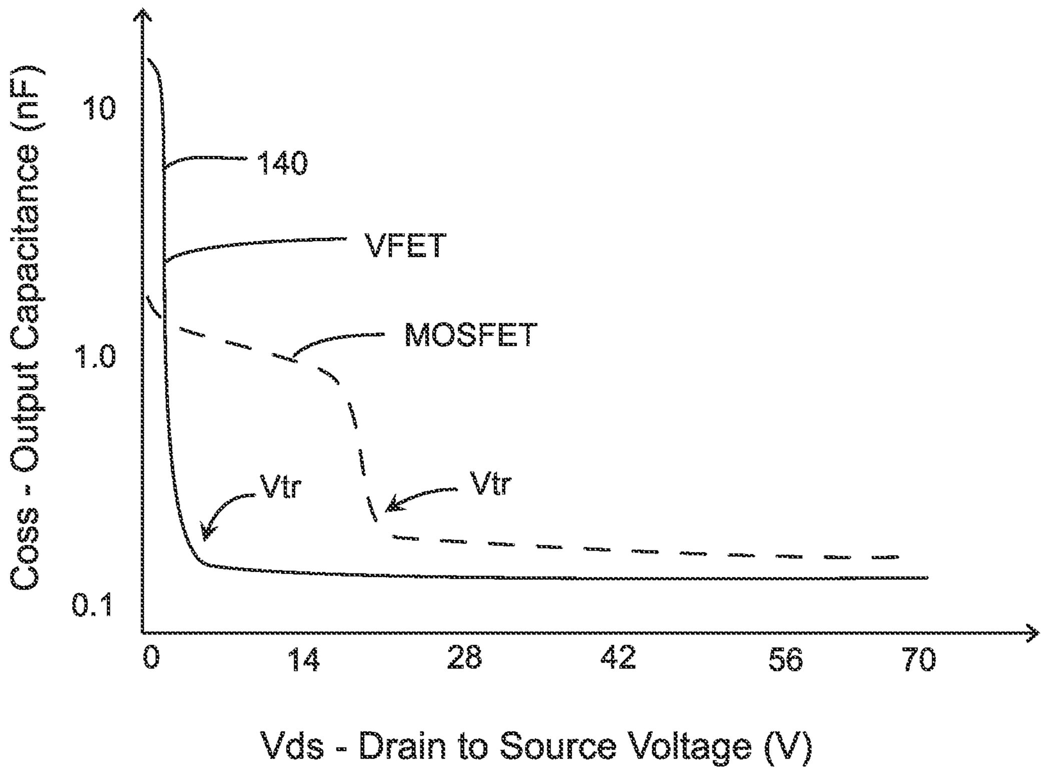
FIG. 7 shows an example plot of output capacitance (Coss) vs. drain-to-source voltage (Vds) for some transistor devices.

Combining SJFETs (having parameters optimized for high frequency ZVS topologies) with the above-described driver circuits (having the ZVS switching threshold set to turn the switches turn ON near the transition voltage) may however increase performance in high frequency converters. A preferred SJFET device adapted for high frequency converter applications (hereinafter a vertical FET or "VFET") is described in Jennings et al., "Super Junction Semiconductor Device with Front-Side Drain Termination" U.S. Prov. Appln. Ser. No. 63/354,681, filed on Jun. 22, 2022 (assigned to Vicor Corp. of Andover, MA.), the entire disclosure of which is incorporated herein by reference (the "VFET Application"). Such VFET devices are preferably designed to establish a low transition voltage, e.g., 2.2 Volts, or 2.0 Volts, or lower (typically at the expense of an increased ON resistance), as described in the VFET Application. FIG. 7 shows a plot of output capacitance, Coss, vs drain-to-source voltage for a 70 Volt VFET (solid line 140) compared with a comparable 70 Volt MOSFET device (broken line). As shown, the transition voltage of the VFET is much lower (approximately 2 Volts) than the MOSFET (approximately 21 Volts) and may exhibit lower Coss over the voltage range above the transition voltage. However, Coss below the transition voltage of the VFET is an order of magnitude greater than that of the MOSFET. The order of magnitude increased in Coss, which traditionally would be regarded as undesirable, may be advantageously employed in high frequency converters to effectively achieve ZVS with increased duty cycle.

Lowering the transition voltage allows the VFET to be turned ON at a low voltage or near the transition voltage without excessive (½*Coss*$V^2$) switching losses in a high frequency converter because the squared voltage term $(Vds=Vtr)^2$ is greatly reduced ($Vds=2^2$ vs $21^2$ i.e. two orders of magnitude reduction). Using the driver circuit with a ZVS threshold at or slightly above the transition voltage, e.g. $V_{ZVS\ Threshold}$=Vtr, to turn the VFETs ON precisely and repeatedly at a drain-to-source voltage at which exponential increases in Coss are avoided (Vzvs approximately =Vtr), switching losses are kept acceptably low, and the duration of the switch transition are minimized, achieving predicable efficient operation for high frequency operation with high power-conversion duty cycles and high power density. The steep increase in Coss below Vtr can be used to slow the voltage transition (Vds) in such applications providing predictable timing between devices connected in parallel (to share the current) or series (to share the voltage), such as in the power converter example of FIGS. 3 and 4 above.

There are a number of approaches to setting the ZVS threshold voltage of the driver circuits. In some implementations, the ZVS threshold may preferably be set at a voltage above the transition voltage of the switch, e.g. the ZVS threshold may be set for 1 Volt greater than the transition voltage ($V_{ZVS\ Threshold}$=Vtr+1), to achieve efficient operation while avoiding unnecessary delays in switch operation. The offset voltage can also be a value different from 1 Volt, such as a value in a range from 0.5 Volt to 1.5 Volt. A practical approach to determining the transition voltage for use in setting the ZVS threshold may be to use the drain-to-source voltage below which the output capacitance, Coss, increases by a factor of two (or more) of its relatively constant value (at higher voltages), e.g. the horizontal relatively flat part of the curve in FIG. 7. The ZVS threshold may also be set closer to the transition voltage, e.g. for a VFET having a transition voltage of 2.2 Volts, the ZVS threshold may be nominally set to 2.3 Volts. Setting the voltage lower may extend switch delays while reducing switching losses. Conversely, setting the voltage higher may sacrifice some switching losses for improved (shorter) switch transitions. In some implementations, as described above, the ZVS threshold can be set to a level that balances switching losses with duty cycle at an operating frequency that is high enough for the desired power or current density of the converter. The ZVS threshold setting should also accommodate the needs of the switching devices. In another preferred example using VFETs having a transition voltage of about 2.2 Volts, the ZVS threshold may be set in a range from 3 Volts to 3.5 Volts.

In some implementations, the ZVS threshold can be set based on the drain-to-source voltage that minimizes switching loss. For example, assume that $Coss \times Vds^2$ has a minimum value when Vds=V1, the ZVS threshold can be set to a value slightly larger than V1, or larger than V1 by an offset value V2, in which V2 is in a range from 0.5 Volts to 1.5 Volts.

D. Buck Boost Converter Example

Figure 6:
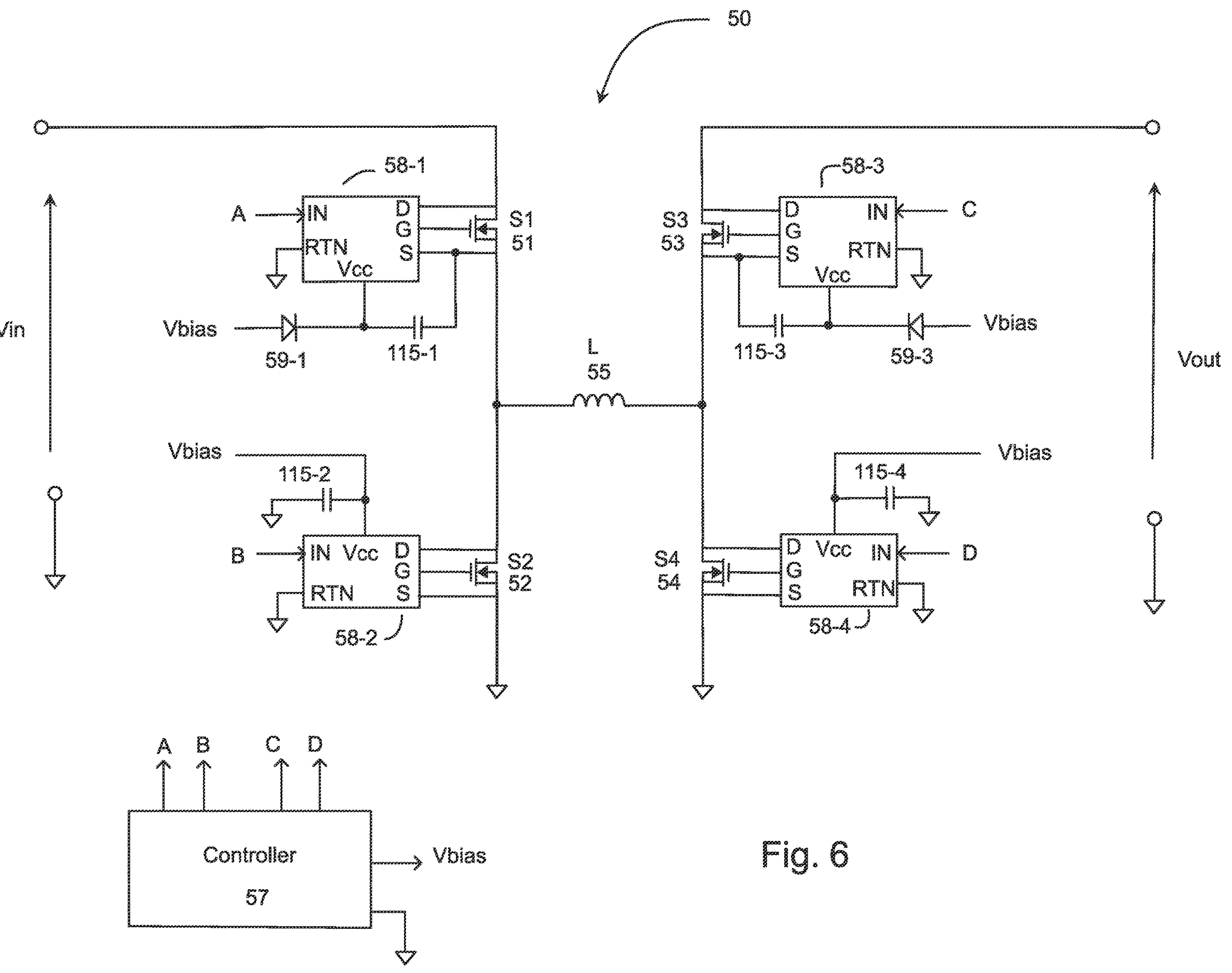
FIG. 6 shows an improved gate drive system for a buck-boost converter based upon the ZVS BB topology.

The above discussion focused on the driver circuit in SAC-based topologies, however, the driver circuit may be advantageously deployed in other converter topologies, such as a buck-boost topology. A preferred buck-boost topology is described in Buck-Boost DC-DC Switching Power Conversion, Vinciarelli, U.S. Pat. No. 7,154,250, issued Dec. 26, 2006 and U.S. Pat. No. 6,788,033, issued Sep. 7, 2004 (the "ZVS BB Patents") (both of which are assigned to Vicor Corp. of Andover, MA., and the entire disclosure of each is incorporated herein by reference). Referring to FIG. 6, a ZVS buck boost switching power converter 50 of the type described in the ZVS BB patents is shown having four driver circuits 58-1, 58-2, 58-3, 58-4 (collectively referenced as 58), connected to operate the four power switches, S1, S2, S3, S4, respectively, in the ZVS BB topology.

Unlike the SAC topology, the switches in the ZVS BB topology may undergo greatly varying ON or OFF times with respect to each other and for each individual switch, the ON and OFF times may also be very disparate. The outputs of the controller 57, A, B, C, D are therefore shown connected directly to the respective driver circuits, 58-1, 58-2, 58-3, 58-4, in FIG. 6. In other words, a gate drive transformer of the type described above in connection with the SAC topologies, may be impractical in the ZVS BB power train, because of the potentially very long ON times and asymmetrical timing between switches.

Referring to FIG. 6, the use of the driver circuit 58-2 is particularly advantageous for controlling S2 52 because depending on circuit conditions, e.g. input voltage, output voltage, and output current, the magnetizing current flowing in the inductor may be insufficient to reduce the voltage across S2 52 before it is turned ON, i.e. ZVS is not attainable under those conditions. The driver circuit 58-2, however, includes the intelligence to turn ON S2 52 quickly when there is sufficient energy for ZVS and more gradually when there is not, thereby ensuring that the switch S2 52 does turn ON, and power train operation continues, even when the voltage across switch S2 fails to reduce sufficiently for ZVS. Although switch S2 52 may be the most challenging and benefit the most, all of the switches in the ZVS BB power train may be advantageously driven using the driver circuits 58 as shown in FIG. 6.

Since each of the driver circuits 58 is not being driven by a transformer, and will not receive a bipolar input voltage, power for operating the driver circuits 58 in direct-coupled circuits may be derived from a ground referenced bias supply as shown in FIG. 6. For the ground-referenced switches, S2 52, S4 54, the Vcc input of the driver circuit, 58-2, 58-4, may be connected directly to the ground-referenced bias supply, Vbias. The bias capacitors, 115-2, 115-4, are retained as shown close to the respective driver, 58-2, 58-4, as shown for bypassing parasitic impedances between the bias supply and the driver circuit. For the floating switches, S1 51, S3 53, bias power may be supplied to the Vcc terminal of the drivers, 58-1, 58-3, but through a respective rectifier, e.g. rectifiers 59-1, 59-3. The capacitors 115-2, 115-4, are retained for storing the energy required to operate the driver circuit and the respective controlled switch. As shown the capacitors, 115-1, 115-3, may be connected between Vcc and the respective source, S, terminals allowing its respective driver circuit, 58-1, 58-3, to remain powered throughout the switching cycle. Each capacitor, 115-1, 115-3, is recharged through its respective diode, 59-1, 59-3, when its source terminal returns to ground, e.g. when its respective complementary switch, S2 52, S4 54, is ON.

As shown in FIG. 6, the driver circuits 58-1, 58-2, 58-3, and 58-4 derive power from a ground referenced bias supply which may be provided by the controller 57 (as shown) or by the source (not shown) supplying the controller 57, or a separate source. Powering the driver circuits independently of the controller outputs allows a single controller to operate a greater number of switches without controller modification.

It should be noted that propagation delays and parasitic inductances and capacitances, particularly in larger higher power converters, can introduce timing errors in power trains using a centralized switch controller both to control overall power train operation and ON/OFF timing of individual switches, creating design challenges, increased switching losses, and other scalability issues. Using the driver circuit for localized ON/OFF switch timing provides scalability, particularly for ZVS and ZCS power train architectures, in multiple ways. Switch timing is improved by deploying the switch driver locally at the controlled device, overcoming the effects of propagation delays and parasitic impedances, allowing multiple switches to operate as one.

Also, the power train controller, e.g. controllers 37 (FIG. 2), 37-1 (FIG. 4), and 57 (FIG. 6) may be used in a broader array of applications. As discussed above, the number of switches driven by a controller may be limited by the collective gate capacitance of the controlled switch or switches, the desired switch transition times, and thus the peak current required to achieve such transitions at the appropriate times. However, a controller having a specific peak output current capability may drive many more switches using the driver circuits described above than directly in the prior drive manner. For example, a controller having a 5 A peak output current capability may be able to drive as many as 10 or more times the number of MOSFETs using the driver circuits than it can without the driver circuits. This benefit is a direct result of the driver circuit's ability to collect and store the energy momentarily required to turn its controlled switch ON over the entire switch cycle. In other words, the controller may easily supply the current required for many switches by averaging the instantaneous current required to turn each switch ON during the switch transition over the entire cycle. And in some power trains, such as the ZVS BB converter of FIG. 6, the controller need not even provide the current required to operate the floating switches, e.g. switches S1 51 and S3 53 (FIG. 6), which may derive their power directly from the power train. The driver circuit helps reduce noise by delaying switch turn ON until a controlled slew rate across the switch is achieved. Finally, a single driver circuit may be deployed in a wide variety of power train topologies and power levels. In applications in which multiple switches are connected in series to operate as one such as described in the RFM Patent, use of the driver circuit enables more accurate voltage sharing by turning the switches OFF quickly (<5 nS) compared to the resonant control which may require a considerable fraction of the cycle.

Note that the functional blocks described above for illustrating the basic operation of the driver circuit, which may be implemented using different circuitry, are preferably optimized for speed, efficiency, and integration. For example, the rectification circuitry, e.g. diodes 116, 117, 118 and 119 (FIG. 5), and 59-1, 59-2 (FIG. 6), may preferably be implemented using controlled switches. The adjustable current source may be implemented using current mirrors and a capacitor connected to the drain terminal to allow the current in the capacitor to divert current from source driving the gate terminal.

A number of embodiments of the invention have been described. Nevertheless, it will be understood that various modifications may be made without departing from the spirit and scope of the invention. For example, a driver circuit can be configured to turn a switch OFF quickly within an amount of time t1 under a first operation condition, turn the switch ON slowly within an amount of time t2 under a second operation condition, and turn the switch ON quickly within an amount of time t3 under a third operation condition, in which t1 can be less than 50%, 40%, 33%, or 20% of t2, and t3 can be less than 50%, 40%, 33%, or 20% of t2. In some examples, the time durations t1, t2, and t3 can be fixed. In some examples, the time durations t1, t2, and t3 can be adjusted using a calibration procedure. In some examples, the time durations t1, t2, and t3 can be dynamically adjusted depending on operation conditions. In some examples, the threshold voltages such as IN Threshold and ZVS Threshold shown in FIG. 5 can be fixed by circuit design. In some examples, the threshold voltages such as IN Threshold and ZVS Threshold can be adjusted using a calibration procedure. In some examples, the threshold voltages such as IN Threshold and ZVS Threshold can be dynamically adjusted depending on operation conditions. In some examples, the circuitry for providing the threshold voltages such as IN Threshold and ZVS Threshold can be contained within the driver chip 100. In some examples, the circuitry for providing the threshold voltages such as IN Threshold and ZVS Threshold may adjusted by circuitry external to the driver chip 100, and the driver chip 100 may include a terminal for adjusting the threshold voltage. The relationship between the output capacitance Coss and the drain-to-source voltage Vds can be different from that shown in FIG. 7. The curves shown in FIG. 7 are merely examples. For example, the transition voltage can be lower or higher than what is shown in FIG. 7.

In some implementations, VFETs can be used in the SAC power train 10 of FIG. 1. For example, VFETs can be used in the primary switches S1 and S2, or the secondary switches SR1 and SR2, or both. Whether a VFET is used in a particular switch depends on the application, and more specifically the input and output voltages.

In some implementations, VFETs can be used in the power train 10-1 of FIG. 3. For example, the input voltage may be high (e.g., 800V, 400V, etc.), and VFETs can be used in the series-connected primary switches S1-1 to S1-8 and S2-1 to S2-8 (FIG. 3). In some examples, VFETS can also be used for the secondary switches SR1A to SR1C and SR2A to SR2C when the output voltage is high enough to benefit from the use of VFETs, e.g., 48 to 60 Volts. Similar considerations can be applied to the use of VFETs in some or all of the switches S1, S2, S3, and S4 of the ZVS buck boost switching power converter 50 of FIG. 6. For example, VFETs can be used for the switches S1 and S2 when the input voltage is high (e.g., 60 Volts or more). VFETs can be used for the switches S3 and S4 when the output voltage is high (e.g., 48 to 60 Volts). In some examples, use of the VFETs in the example of FIG. 6 can lead to improved ZVS transitions.

Accordingly, other embodiments are within the scope of the following claims.

What is claimed is:

1. An apparatus for operating a semiconductor switch having a gate terminal, a source terminal, and a drain terminal, the apparatus comprising:

driver circuitry having a first input for receiving a switch control signal, an output for connection to the gate terminal, a common terminal for connection to the source terminal, and a second input for sensing the drain terminal, the driver circuitry including:

a first switch to turn off the gate terminal in response to an OFF signal at the first input;

a threshold detector connected to the second input and constructed and arranged to provide a ZVS signal indicating whether the drain-to-source voltage level is below a predetermined threshold;

a second switch to turn on the gate terminal after an ON signal is received at the first input and the ZVS signal is received from the threshold detector;

a slope detector connected to the second input and constructed and arranged to provide a slope signal indicating the rate of change of the drain-to-source voltage level;

gate slew control circuitry constructed and arranged to control a rate of change of voltage at the output for slowly turning ON the semiconductor switch in response to an ON signal at the first input and the slope signal if the ZVS signal indicates the drain-to-source voltage is above the predetermined threshold.

2. The apparatus of claim 1 wherein the driver circuitry is constructed and arranged to:

(a) turn the semiconductor switch OFF quickly using the first switch in response to an OFF signal at the first input;

(b) turn the semiconductor switch ON slowly using the gate slew control circuitry in response to a ON signal at the first input and the slope signal while the ZVS signal indicates the drain-to-source voltage is above the predetermined threshold; and (c) turn the semiconductor switch ON quickly using the second switch in response to a ON signal at the first input once the ZVS signal indicates the drain-to-source voltage is below the predetermined threshold.

3. The apparatus of claim 2 wherein the driver circuitry is configured to (a) turn the semiconductor switch OFF within a first time duration using the first switch in response to the OFF signal at the first input, (b) turn the semiconductor switch ON slowly within a second time duration using the gate slew control circuitry in response to the ON signal at the first input and the slope signal while the ZVS signal indicates the drain-to-source voltage is above the predetermined threshold, and (c) turn the semiconductor switch ON within a third time duration using the second switch in response to the ON signal at the first input once the ZVS signal indicates the drain-to-source voltage is below the predetermined threshold;

wherein the first time duration is less than 33% of the second time duration, and the third time duration is less than 33% of the second time duration.

4. The apparatus of claim 2 wherein the driver circuitry is further constructed and arranged to:

(d) adjust the rate of change of voltage at the output as a function of the slope signal while the ON signal is present at the first input and the ZVS signal indicates the drain-to-source voltage is above the predetermined threshold.

5. The apparatus of claim 4 wherein the driver circuitry is configured to decrease the rate of change of voltage at the output in response to an increase of the slope signal while the ON signal is present at the first input and the ZVS signal indicates the drain-to-source voltage is above the predetermined threshold.

6. The apparatus of claim 1 wherein the driver circuitry is constructed and arranged to:

(a) turn the semiconductor switch OFF quickly using the first switch in response to an OFF signal at the first input;

(b) slowly increase a voltage at the output in response to an ON signal at the first input while the ZVS signal indicates the drain-to-source voltage is above the predetermined threshold;

(c) turn the semiconductor switch ON with a predetermined minimum delay in response to an ON signal at the first input using the second switch if the ZVS signal indicates the drain-to-source voltage is below the predetermined threshold; wherein the driver circuitry establishes a maximum delay for turning the semiconductor switch ON after an ON signal is received at the first input and a minimum delay for turning the semiconductor switch ON after the ZVS signal indicates the drain-to-source voltage is below the predetermined threshold.

7. The apparatus of claim 6 wherein the driver circuitry is configured to (a) turn the semiconductor switch OFF within a first time duration using the first switch in response to the OFF signal at the first input;

(b) increase the voltage at the output from a first level that causes the semiconductor switch to be OFF to a second level that causes the semiconductor switch to be ON within a second time duration in response to the ON signal at the first input while the ZVS signal indicates the drain-to-source voltage is above the predetermined threshold;

(c) turn the semiconductor switch ON within a third time duration in response to the ON signal at the first input using the second switch if the ZVS signal indicates the drain-to-source voltage is below the predetermined threshold;

wherein the first time duration is less than 33% of the second time duration, and the third time duration is less than 33% of the second time duration.

8. The apparatus of claim 6 wherein the driver circuitry is configured to turn the semiconductor switch ON with a delay that ranges from a predetermined minimum value to a predetermined maximum value, wherein the driver circuitry is configured to turn the semiconductor switch ON with a delay having the maximum delay value after the ON signal is received at the first input while the ZVS signal indicates the drain-to-source voltage is above the predetermined threshold;

wherein the driver circuitry is configured to turn the semiconductor switch ON with a delay having the predetermined minimum value in response to the ON signal at the first input using the second switch if the ZVS signal indicates the drain-to-source voltage is below the predetermined threshold.

9. The apparatus of claim 6 wherein the driver circuitry is further constructed and arranged to adjust a delay for turning the semiconductor switch ON after the ON signal is received at the first input as a function of the slope signal.

10. The apparatus of claim 9 wherein the driver circuitry is further constructed and arranged to increase the time required to turn the semiconductor switch ON slowly after the ON signal is received at the first input for a slope signal indicating an increased rate of change of the drain-to-source voltage level.

11. The apparatus of claim 9 wherein the driver circuitry is further constructed and arranged to decrease the time required to turn the semiconductor switch ON slowly after the ON signal is received at the first input for a slope signal indicating a decreased rate of change of the drain-to-source voltage level.

12. The apparatus of claim 9 wherein the driver circuitry is configured to set a larger delay for turning the semiconductor switch ON after the ON signal is received at the first input and the slope signal has larger value, and set a smaller delay for turning the semiconductor switch ON after the ON signal is received at the first input and the slope signal has smaller value.

13. The apparatus of claim 1 wherein the predetermined threshold is equal to a transition voltage for an output capacitance of the respective switch, such that the output capacitance, Coss, of the respective switch increases exponentially as a function of reductions in the drain-to-source voltage of the respective switch below the predetermined threshold.

14. The apparatus of claim 1 wherein the predetermined threshold is greater than a transition voltage for an output capacitance of the respective switch, such that the output capacitance, Coss, of the respective switch increases exponentially as a function of reductions in the drain-to-source voltage of the respective switch below the predetermined threshold.

15. The apparatus of claim 1 wherein the first switch and the second switch have one or more components in common.

16. The apparatus of claim 15 wherein the first switch comprises a current sink that is activated in response to the OFF signal.

17. The apparatus of claim 16 wherein the second switch comprises a first current source that is activated in response to the ON signal received at the first input and the ZVS signal received from the threshold detector.

18. The apparatus of claim 17 wherein the gate slew control circuitry comprises a second current source configured to provide a current that is adjusted based on the slope signal if the ZVS signal indicates the drain-to-source voltage is above the predetermined threshold.

19. Apparatus for converting power from an input for delivery to an output, the apparatus comprising:

- a power train including one or more input switches constructed and arranged to selectively connect a resonant circuit including a transformer to the input, and one or more output switches constructed and arranged to selectively connect the transformer to the output;
- a switch timing controller constructed and arranged to generate timing signals to operate the power train in a series of converter operating cycles;
- one or more switch drivers having an input connected to receive selected ones of the timing signals from the switch timing controller;
- wherein at least some of the input switches or the output switches, or both include a switch control terminal, a common terminal, and a switched terminal that is controlled by a respective switch driver;
- each switch driver including a first input for receiving a switch control signal from the switch controller, an output for connection to the control terminal of its respective switch, a reference terminal for connection to the common terminal of its respective switch, a second input for sensing circuit conditions at the switched terminal of its respective switch, and a power input for receiving power to operate, the switch driver including:
  - a first current sink connected to sink a first current from the output in response to an OFF signal at the first input;
  - a threshold detector connected to the second input and constructed and arranged to provide a ZVS signal indicating that a voltage, Vsw, across the switched terminal and the common terminal of its respective switch is at or below a predetermined threshold;
  - a first current source connected to deliver a first current to the output in response to an ON signal at the first input if the ZVS signal is received from the threshold detector;
  - a slope detector connected to the second input and constructed and arranged to provide a slope signal indicating the rate of change of the voltage, Vsw, across the switched terminal and the common terminal of its respective switch;
  - a second current source connected to deliver a second current to the output in response to an ON signal at the first input, the second current being adjusted by the slope signal.

20. The apparatus of claim 19 wherein each switch driver is constructed and arranged to:

(a) turn its respective switch OFF quickly using the first current sink in response to an ON signal at the first input;

(b) turn its respective switch ON slowly using the second current source in response to an ON signal at the first input;

(c) turn its respective switch ON quickly using the first current source in response to an ON signal at the first input when the voltage Vsw of its respective switch is below the predetermined threshold; and (e) adjust the rate at which the respective switch is turned ON based upon the rate of change of the voltage Vsw of its respective switch.

21. The apparatus of claim 20 wherein one or more of the at least some switches include a plurality of semiconductor switches connected in parallel to function as a single switch, and a plurality of respective switch drivers connected to operate respective ones of the plurality of semiconductor switches.

22. The apparatus of claim 20 wherein each switch driver is constructed and arranged to adjust a delay for turning the respective switch ON after the ON signal is received at the first input as a function of the slope signal;

- wherein the switch driver is constructed and arranged to increase the time required to turn the respective switch ON slowly after the ON signal is received at the first input for a slope signal indicating an increased rate of change of the switched terminal voltage level;
- wherein the switch driver is constructed and arranged to decrease the time required to turn the respective switch ON slowly after the ON signal is received at the first input for a slope signal indicating a decreased rate of change of the switched terminal voltage level.

23. The apparatus of claim 19 wherein the one or more switch drivers comprise a plurality of switch drivers, the apparatus further comprising:

- a gate drive transformer having a primary winding connected to receive timing signals from the switch timing controller and a plurality of secondary windings each connected to an input of a respective one of the plurality of switch drivers.

24. The apparatus of claim 23 wherein one or more of the at least some switches include a plurality of semiconductor switches connected in parallel to function as a single switch, and a plurality of respective switch drivers connected to operate respective ones of the plurality of semiconductor switches.

25. Apparatus for converting power from an input for delivery to output terminals, the apparatus comprising:

a switching power conversion stage having a power train including a plurality of distributed output switches constructed and arranged to selectively conduct power from the power train to the output terminals;

each output switch including a switch control terminal, a common terminal, and a switched terminal;

each output switch being driven by a respective switch driver physically located proximal to said switch;

a switch timing controller constructed and arranged to generate timing signals to operate the power train including the plurality of distributed output switches, in a series of converter operating cycles;

a gate drive transformer having a primary winding connected to receive ON and OFF signals from the switch timing controller and a plurality of secondary windings each connected to deliver ON and OFF signals to one or more respective switch drivers;

wherein each switch driver includes a first input connected to a respective secondary winding of the gate drive transformer to receive the ON and OFF signals from the timing controller, an output for connection to the control terminal of its respective switch, a reference terminal for connection to the common terminal of its respective switch, a second input for sensing circuit conditions at the switched terminal of its respective switch, and a power input connected to the respective secondary winding of the gate drive transformer for receiving power to operate, the switch driver including circuitry operative to: quickly turn OFF the respective switch in response to the OFF signal at the first input, turn ON the respective switch in response to an ON signal at the first input if the voltage (Vsw) across the switched and common terminals of the respective switch is below a predetermined threshold; and control a rate of change of voltage at the output for slowly turning ON the respective power switch in response to an ON signal at the first input if the voltage (Vsw) across the switched and common terminals of the respective switch is above the predetermined threshold.

26. The apparatus of claim 25 wherein each of at least some of the switch drivers comprises:

a threshold detector connected to the second input and constructed and arranged to provide a zero-voltage switching (ZVS) signal indicating whether the voltage Vsw across the switched and common terminals of the respective switch is below the predetermined threshold;

a slope detector connected to the second input and constructed and arranged to provide a slope signal indicating the rate of change of the voltage Vsw across the switched and common terminals of the respective switch; and gate slew control circuitry constructed and arranged to control the rate of change of voltage at the output for slowly turning ON the respective switch in response to an ON signal at the first input and the slope signal if the ZVS signal indicates the voltage Vsw across the switched and common terminals of the respective switch is above the predetermined threshold.

27. The apparatus of claim 26 wherein each of at least some of the switch drivers is constructed and arranged to adjust a delay for turning the respective switch ON after the ON signal is received at the first input as a function of the slope signal;

wherein each switch driver is further constructed and arranged to increase the time required to turn the respective switch ON slowly after the ON signal is received at the first input for a slope signal indicating an increased rate of change of the voltage Vsw across the switched and common terminals of the respective switch.

28. The apparatus of claim 27 wherein each of at least some of the switch drivers is further constructed and arranged to decrease the time required to turn the respective switch ON slowly after the ON signal is received at the first input for a slope signal indicating a decreased rate of change of the voltage Vsw across the switched and common terminals of the respective switch.

29. The apparatus of claim 26 wherein each of at least some of the switch drivers comprises:

a first current source connected to deliver a first current to the output in response to an ON signal at the first input if the ZVS signal indicates that the voltage Vsw across the switched and common terminals of the respective switch is below the predetermined threshold; and a second current source connected to deliver a second current to the output in response to an ON signal at the first input, the second current being adjusted by the slope signal.

30. The apparatus of claim 25 wherein the driver circuit includes circuitry configured to turn OFF the respective switch within a first time duration in response to the OFF signal at the first input, turn ON the respective switch within a second time duration in response to the ON signal at the first input if the voltage Vsw across the switched and common terminals of the respective switch is below the predetermined threshold, and control the rate of change of voltage at the output for turning ON the respective power switch within a third time duration in response to the ON signal at the first input if the voltage Vsw across the switched and common terminals of the respective switch is above the predetermined threshold;

wherein the first time duration is less than 33% of the third time duration, and the second time duration is less than 33% of the third time duration.

31. The apparatus of claim 25 wherein each switch driver includes:

a first current sink connected to sink a first current from the output in response to an OFF signal at the first input;

a threshold detector connected to the second input and constructed and arranged to provide a zero-voltage switching (ZVS) signal indicating that a voltage, Vsw, across the switched terminal and the common terminal of its respective output switch is at or below a predetermined threshold;

a first current source connected to deliver a first current to the output in response to an ON signal at the first input if the ZVS signal is received from the threshold detector;

a slope detector connected to the second input and constructed and arranged to provide a slope signal indicating the rate of change of the voltage, Vsw, across the switched terminal and the common terminal of its respective output switch;

a second current source connected to deliver a second current to the output in response to an ON signal at the first input, the second current being adjusted by the slope signal.

32. The apparatus of claim 25 wherein each switch driver is constructed and arranged to adjust a delay for turning the respective output switch ON after the ON signal is received at the first input as a function of the slope signal;

wherein the switch driver is constructed and arranged to increase the time required to turn the respective output switch ON slowly after the ON signal is received at the first input for a slope signal indicating an increased rate of change of the switched terminal voltage level;

wherein the switch driver is constructed and arranged to decrease the time required to turn the respective switch ON slowly after the ON signal is received at the first input for a slope signal indicating a decreased rate of change of the switched terminal voltage level.

33. A method of operating a power converter comprising:

providing a plurality of power switches to operate a power train, each power switch having a respective gate, source, and drain terminals, and a drain-source voltage, Vsw;

providing a switch timing controller constructed and arranged to provide ON and OFF switch control signals to operate the power train;

providing a switch driver for operating a respective power switch;

providing each switch driver a first input for receiving the switch control signals, an output for connection to the gate terminal, a common terminal for connection to the source terminal, and a second input for sensing the drain terminal, of the respective power switch;

using the switch driver to quickly turn off the respective power switch in response to the OFF signal at the first input, turn on the respective power switch in response to an ON signal at the first input if the drain-source voltage, Vsw, of the respective power switch is below a predetermined threshold, and control a rate of change of voltage at the output for slowly turning ON the respective power switch in response to an ON signal at the first input if the drain-source voltage, Vsw, of the respective power switch is above the predetermined threshold.

34. The method of claim 33, comprising:

providing a plurality of switch drivers;

providing a gate drive transformer having a primary winding constructed and arranged to receive the switch control signals from the switch timing controller and a plurality of secondary windings; and connecting each secondary winding to the first input of a respective switch driver.

35. The method of claim 34, comprising:

providing a plurality of semiconductor switches having the source and drain terminals connected in parallel for predetermined ones of the plurality of power switches; and providing a switch driver for each semiconductor switch in the plurality of semiconductor switches;

wherein the drain-source voltage, Vsw, of each predetermined one power switch is substantially equal to the drain-source voltage, Vds, of each respective semiconductor switch.

36. The method of claim 35 further comprising:

providing a second plurality of semiconductor switches for predetermined others of the plurality of power switches;

connecting the semiconductor switches of the second plurality in series to divide the drain-source voltage, Vsw, of each predetermined other power switch, wherein the drain-source voltage, Vds, of each semiconductor switch of the second plurality is a fraction of the drain-source voltage, Vsw, of the predetermined other power switch;

providing a respective switch driver for each semiconductor switch of the second plurality; and connecting the first input of each respective switch driver to a respective secondary winding to receive the switch control signals via the gate drive transformer.

37. The method of claim 36 further comprising:

providing an auxiliary input for each respective switch driver;

connecting the auxiliary input of each respective switch driver to the respective secondary winding;

using each respective switch driver to harness energy in the switch control signals received from the respective secondary winding; and using the energy to operate the respective switch.

38. The method of claim 34, further comprising providing a resonant circuit including a transformer for the power train and wherein the switch timing controller is constructed and arranged to operate the power train such that an output voltage of the power train divided by an input voltage to the power train is a fixed-ratio subject to an output resistance.

39. The method of claim 38, further comprising using a current flowing in the transformer to reduce the drain-source voltage of the respective switch prior to turning the respective switch ON.

40. The method of claim 39, further comprising providing a plurality of semiconductor switches having the source and drain terminals connected in parallel for predetermined ones of the plurality of power switches and providing a switch driver for each semiconductor switch in the plurality of semiconductor switches.

41. The method of claim 39, further comprising:

providing a plurality of semiconductor switches for predetermined ones of the plurality of power switches;

connecting the semiconductor switches in series to divide the drain-source voltage, Vsw, of each predetermined one power switch, wherein the drain-source voltage, Vds, of each semiconductor switch is a fraction of the drain-source voltage, Vsw, of the predetermined one power switch;

providing a respective switch driver for each semiconductor switch; and connecting the first input of each respective switch driver to a respective secondary winding to receive the switch control signals via the gate drive transformer.

42. The method of claim 41 further comprising:

providing an auxiliary input for each respective switch driver;

connecting the auxiliary input of each respective switch driver to the respective secondary winding;

using the switch driver to harness energy in the switch control signals received from the respective secondary winding; and using the energy to operate the respective switch.

43. The method of claim 33, further comprising using a current flowing in an inductive component to reduce the drain-source voltage of the respective switch prior to turning the respective switch ON.

44. The method of claim 33, further comprising providing an inductive component for the power train and wherein the switch timing controller is constructed and arranged to operate the power train to control an output variable of the power train.

45. The method of claim 44 wherein the switch timing controller is constructed and arranged to operate the power train to convert power either in a forward direction from an input to an output or in a reverse direction from an output to an input.

46. The method of claim 45, further comprising providing a plurality of semiconductor switches having the source and drain terminals connected in parallel for predetermined ones of the plurality of power switches and providing a switch driver for each semiconductor switch in the plurality of semiconductor switches.

47. The method of claim 44, further comprising using a current flowing in the inductive component to reduce the drain-source voltage, Vsw, of the respective power switch prior to turning the respective switch ON.

48. The method of claim 47, further comprising providing a plurality of semiconductor switches having the source and drain terminals connected in parallel for predetermined ones of the plurality of power switches and providing a switch driver for each semiconductor switch in the plurality of semiconductor switches.

49. The method of claim 44 wherein the switch timing controller is constructed and arranged to operate the power train to control an output voltage.

50. The method of claim 44 wherein the switch timing controller is constructed and arranged to operate the power train to control an output current.

51. The method of claim 44, further comprising:

providing a gate drive transformer having a primary winding connected to receive the switch control signals from the switch timing controller and a plurality of secondary windings;

providing a plurality of semiconductor switches for predetermined ones of the plurality of power switches;

connecting the semiconductor switches in series to divide the drain-source voltage, Vsw, of each predetermined one power switch, wherein the drain-source voltage, Vds, of each semiconductor switch is a fraction of the drain-source voltage, Vsw, of the predetermined one power switch;

providing a respective switch driver for each semiconductor switch; and connecting the first input of each respective switch driver to a respective secondary winding to receive the switch control signals via the gate drive transformer.

52. The method of claim 51, further comprising:

providing an auxiliary input for each respective switch driver;

connecting the auxiliary input of each respective switch driver to the respective secondary winding;

using the switch driver to harness energy in the switch control signals received from the respective secondary winding; and using the energy to operate the respective switch.

53. The method of claim 33, further comprising:

setting the predetermined threshold to a voltage that approximates a transition voltage for an output capacitance of the respective switch, such that the output capacitance, Coss, of the respective switch increases exponentially as the drain-to-source voltage decreases below the predetermined threshold.

54. The method of claim 33, wherein turning on or off the respective power switch comprises using the switch driver to turn off the respective power switch within a first time duration in response to the OFF signal at the first input, turn on the respective power switch within a second time duration in response to the ON signal at the first input if the drain-source voltage Vsw of the respective power switch is below the predetermined threshold, and control the rate of change of voltage at the output for turning on the respective power switch within a third time duration in response to the ON signal at the first input if the drain-source voltage Vsw of the respective switch is above the predetermined threshold;

wherein the first time duration is less than 33% of the third time duration, and the second time duration is less than 33% of the third time duration.

55. A method of operating a power converter comprising:

providing a plurality of power switches to operate a power train, including an inductive component, each power switch having a respective gate, source, and drain terminal, a drain-to-source output capacitance, a drain-source voltage, Vsw, and a transition voltage, Vtr, for the output capacitance, Coss, wherein Coss=c1 when Vsw=Vtr, Coss=c2 when Vsw=40V, and c1=2×c2;

providing a switch timing controller constructed and arranged to provide ON and OFF switch control signals to operate the power train;

providing a switch driver for operating a respective power switch;

the switch driver having a first input for receiving the switch control signals, an output for connection to the gate terminal, a common terminal for connection to the source terminal, and a second input for sensing the drain terminal, of the respective power switch;

using the switch driver to quickly turn off the respective switch in response to the OFF signal at the first input, turn on the respective switch in response to an ON signal at the first input if the drain-source voltage, Vsw, of the respective switch is below a predetermined threshold, and control a rate of change of voltage at the output for slowly turning ON the respective power switch in response to an ON signal at the first input if the drain-source voltage, Vsw, of the respective switch is above the predetermined threshold; and setting the predetermined threshold to a voltage greater than the transition voltage for the output capacitance of the respective switch, such that the respective switch is turned ON to discharge its output capacitance, Coss, at a drain-source voltage, Vsw, that approximates the transition voltage.

56. The method of claim 55 wherein providing the switch driver comprises:

providing a first current sink connected to sink a first current from the output in response to an OFF signal at the first input;

providing a threshold detector connected to the second input and constructed and arranged to provide a ZVS signal indicating that the voltage Vsw across the switched terminal and the common terminal of its respective output switch is at or below the predetermined threshold;

providing a first current source connected to deliver a first current to the output in response to an ON signal at the first input if the ZVS signal is received from the threshold detector;

providing a slope detector connected to the second input and constructed and arranged to provide a slope signal indicating the rate of change of the voltage, Vsw, across the switched terminal and the common terminal of its respective switch; and providing a second current source connected to deliver a second current to the output in response to an ON signal at the first input, the second current being adjusted by the slope signal.

57. The method of claim 56 wherein adjusting the second current by the slope signal comprises:

increasing the time required to turn the respective switch ON slowly after the ON signal is received at the first input for a slope signal indicating an increased rate of change of the switched terminal voltage level; and decreasing the time required to turn the respective switch ON slowly after the ON signal is received at the first input for a slope signal indicating a decreased rate of change of the switched terminal voltage level.

58. The method of claim 55, comprising:

providing a gate drive transformer having a primary winding constructed and arranged to receive the switch control signals from the switch timing controller and a plurality of secondary windings; and connecting each secondary winding to the first input of a respective switch driver.

59. The method of claim 58, further comprising:

providing a plurality of semiconductor switches having the source and drain terminals connected in parallel for predetermined ones of the plurality of power switches; and providing a switch driver for each semiconductor switch in the plurality of semiconductor switches;

wherein the drain-source voltage, Vsw, of each predetermined one power switch is substantially equal to the drain-source voltage, Vds, of each respective semiconductor switch.

60. The method of claim 55, further comprising using a current flowing in an inductive component to reduce the drain-source voltage of the respective switch prior to turning the respective switch ON.

61. The method of claim 60, further comprising providing a resonant circuit including a transformer for the power train, and using the switch timing controller to operate the power train such that an output voltage of the power train divided by an input voltage to the power train is a fixed-ratio subject to an output resistance.

62. The method of claim 61, further comprising using a current flowing in the transformer to reduce the drain-source voltage of the respective switch prior to turning the respective switch ON.

63. The method of claim 62, further comprising providing a plurality of semiconductor switches having the source and drain terminals connected in parallel for predetermined ones of the plurality of power switches and providing a switch driver for each semiconductor switch in the plurality of semiconductor switches.

64. The method of claim 55, further comprising providing an inductive component for the power train and wherein the switch timing controller is constructed and arranged to operate the power train to control an output variable of the power train.

65. The apparatus of claim 20 wherein each driver circuit is configured to:

(a) turn its respective switch OFF within a first time duration using the first current sink in response to the ON signal at the first input;

(b) turn its respective switch ON within a second time duration using the second current source in response to the ON signal at the first input; and (c) turn its respective switch ON within a third time duration using the first current source in response to the ON signal at the first input when the voltage Vsw of its respective switch is below the predetermined threshold;

wherein the first time duration is less than 33% of the second time duration, and the third time duration is less than 33% of the second time duration.

* * * * *